(12) United States Patent
Yoo et al.

(10) Patent No.: US 7,527,989 B2
(45) Date of Patent: May 5, 2009

(54) METHOD FOR FABRICATING LIQUID CRYSTAL DISPLAY PANEL

(75) Inventors: Soon Sung Yoo, Kyonggi-do (KR); Youn Gyoung Chang, Kyonggi-do (KR); Heung Lyul Cho, Kyonggi-do (KR); Seung Hee Nam, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 486 days.

(21) Appl. No.: 11/099,587

(22) Filed: Apr. 6, 2005

(65) Prior Publication Data

US 2005/0186718 A1 Aug. 25, 2005

Related U.S. Application Data

(62) Division of application No. 10/422,724, filed on Apr. 25, 2003, now Pat. No. 6,897,099.

(30) Foreign Application Priority Data

Jul. 23, 2002 (KR) .......................... 10-2002-43305
Dec. 27, 2002 (KR) .......................... 10-2002-84910

(51) Int. Cl.
*H01L 21/00* (2006.01)
(52) U.S. Cl. ...................................... 438/23
(58) Field of Classification Search ............. 438/23, 438/28, 30; 257/E33.062; 349/152
See application file for complete search history.

(56) References Cited

U.S. PATENT DOCUMENTS

| 5,825,449 A | 10/1998 | Shin |
| 6,340,963 B1 * | 1/2002 | Anno et al. ............. 345/92 |
| 6,493,048 B1 * | 12/2002 | Baek et al. ............. 349/43 |
| 6,500,701 B2 * | 12/2002 | Higashi et al. ......... 438/149 |
| 6,927,830 B2 * | 8/2005 | Chung et al. .......... 349/149 |
| 2002/0021403 A1 * | 2/2002 | Kim et al. ............. 349/187 |
| 2002/0093016 A1 * | 7/2002 | Lim et al. ............. 257/59 |
| 2002/0122143 A1 * | 9/2002 | Woo et al. ............ 349/42 |
| 2003/0112387 A1 | 6/2003 | Lim ...................... 349/110 |
| 2003/0180978 A1 | 9/2003 | Kweon et al. ......... 438/30 |

FOREIGN PATENT DOCUMENTS

| KR | 1020000033515 | 6/2000 |
| KR | 1020000039313 | 7/2000 |
| KR | 1020020006612 | 1/2002 |

* cited by examiner

*Primary Examiner*—David S Blum
(74) *Attorney, Agent, or Firm*—McKenna Long & Aldridge LLP

(57) ABSTRACT

A method for fabricating a liquid crystal display panel is provided. A thin film transistor array substrate and a color filter array substrate are formed. The thin film transistor array substrate includes a screen region having gate lines, data lines, thin film transistors, and pixel electrodes; a pad region having gate pads, an overetch prevention pattern formed overlapped with a gate insulating film in an outer portion of each gate pad, and data pads; data pad protection electrodes each on a respective data pad, and a protection film on an entire surface of the screen region and the pad region. The thin film transistor array substrate and the color filter array substrate are bonded together so that the pad region remains uncovered. Also, a portion of the protection film and the overetch prevention pattern of the pad region are etched to partially expose the gate pads and the data pad protection electrodes, and to form gate holes in the gate insulating film over corresponding gate pads.

7 Claims, 27 Drawing Sheets

METHOD FOR FABRICATING LIQUID CRYSTAL DISPLAY PANEL

This application is a divisional of U.S. patent application Ser. No. 10/422,724, filed Apr. 25, 2003 now U.S. Pat. No. 6,897,099, which is hereby incorporated by reference. This application also claims the benefit of Korean Patent Application No. P2002-43305 filed on Jul. 23, 2002, and Korean Patent Application No. P2002-84910 filed on Dec. 27, 2002, which are hereby incorporated by reference.

BACKGROUND OF THE INVENTION

1. Field of the Invention

The present invention relates to liquid crystal display devices, and more particularly, to a method for fabricating a liquid crystal display panel which can simplify a fabrication process.

2. Background of the Related Art

In keeping pace with development of an information oriented society, demands on display technologies have increased in a variety of aspects. Recently, to meet the demands, different flat display technologies, such as Liquid Crystal Display (LCD) devices, Plasma Display Panel (PDP) devices, Electro Luminescent Display (ELD) devices, Vacuum Fluorescent Display (VFD) devices, and the like, have been under development. Some of these technologies are employed as display devices in various applications. Among the flat displays, LCD devices have been the most widely used as portable displays. Here, LCD devices have been replacing the CRT (Cathode Ray Tube) due to excellent picture quality, light weight, thinness, and low power consumption. In addition to portable LCD devices, such as monitors for notebook computers, LCD devices are under development for televisions and computer monitors.

Despite the various LCD technical developments on the LCD device for use in different fields, the efforts to enhance picture quality in LCD devices have been inconsistent with respect to the features and advantages of the LCD device in many aspects. Therefore, for employing the LCD device in various fields as a general display device, it is key to develop and implement high quality picture (such as high definition), high luminance, and large sized screen with light weight, thinness, and low power consumption.

The LCD device includes a liquid crystal display panel for displaying a picture, and a driving portion for providing a driving signal to the liquid crystal panel. The liquid crystal display panel has upper and lower substrates bonded with a gap therebetween, and a liquid crystal layer formed between the upper and lower substrates. The lower substrate (a thin film transistor array substrate), has a plurality of gate lines and data lines arranged intersecting each other, thin film transistors at every intersection of the gate lines and the data lines as switch devices, pixel electrodes and the like formed in an liquid crystal cell unit each connected to the thin film transistors, and an alignment film coated over the system elements. The gate lines and data lines receive scan signals and pixel voltage signals from driving circuits through relevant pads respectively. A given thin film transistor supplies a pixel voltage signal supplied to a data line to a pixel electrode in response to a scan signal supplied to a gate line. The upper substrate (a color filter array substrate) has color filters formed for each LCD cell, a black matrix for separating the color filters and reflection of an external light, a common electrode for commonly supplying a reference voltage to the LCD cells, and an alignment film coated thereon.

Fabrication of the LCD panel is finished by separately fabricating and bonding the thin film transistor array substrate and the color filter array substrate followed by injecting liquid crystal therein and sealing the substrates. In fabricating the LCD device, not one LCD panel is formed on one substrate, but rather a plurality of LCD panels are formed on a large sized substrate depending on the size of the substrate and the LCD panel.

The thin film transistor (TFT) array substrate of the LCD panel is a major portion of the cost of the LCD panel because the TFT array substrate has a complicated fabrication process including semiconductor fabrication processes and a plurality of masking processes. For solving this, fabrication processes have been developed to reduce a number of mask processes. This is because each mask process includes many processes, such as deposition, cleaning, photolithography, etching, photoresist peeling, and inspection.

A related art method for fabricating an LCD panel will be described. First, the related art TFT array substrate in the LCD panel will be described.

Referring to FIG. 1, on the lower substrate 20 (see FIGS. 2A-2D), there are gate lines 21 running in one direction in parallel at fixed intervals, a gate electrode 21a projected from the gate line 21 in one direction, and a storage lower electrode (not shown) at a position of a storage capacitor of a forward gate line. A gate pad 21b is disposed at an end of the gate line 21, and a data pad 26c is disposed at an end of the data line 26. A gate insulating film is disposed on the lower substrate 20 having the gate line 21, the gate electrode 21a, and the storage lower electrode. An active layer 25 is disposed on the gate insulating film over the gate electrode 21a. The active layer 25 is formed of amorphous silicon. Data lines 26 are formed perpendicular to the gate lines 21 to define pixel regions. A source electrode 26a projects from the data line 26 in one direction and overlaps with a portion of the active layer 25. A drain electrode 26d overlaps with the other portion of the active layer 25 spaced from the source electrode 26a. An ohmic contact layer 24a (see FIGS. 2C-2D) is disposed on the active layer 25 under the source electrode 26a and the drain electrode 26b. A storage upper electrode (not shown) is formed together with the drain electrode 26b extended to a top of the storage lower electrode formed on the forward gate line. A pixel electrode 28a contacts the storage upper electrode and the drain electrode 26b through respective contact holes in the pixel region. An organic film (not shown) is formed on an entire surface of the lower substrate 20 having the thin film transistor and the pixel region having contact holes to the gate pad 21b and data pad 26c.

A related art method for fabricating a thin film transistor array substrate of an LCD panel will be described. FIGS. 2A-2D illustrate sections across lines I-I', II-II' and III-III' in FIG. 1 showing the steps of a fabrication method.

Referring to FIG. 2A, a conductive metal is deposited on the lower substrate 20 and patterned to form a gate pad 21b having a predetermined large area at one end, a gate line extended in one direction from the gate pad 21b, and a gate electrode 21a projected in a direction from the gate line. Then, an insulating film 22, and first and second semiconductor layers (an amorphous silicon layer, and n$^+$ doped amorphous silicon layer) 23 and 24 for forming the active layer are formed on an entire surface of the lower substrate 20 having the gate electrode 21a formed thereon in succession.

Next, referring to FIG. 2B, the first and second semiconductor layers 23 and 24 of FIG. 2A are patterned by using a mask to form an active layer 25 of an island form on the gate electrode 21a.

Referring to FIG. 2C, a conductive metal is deposited on an entire surface of the lower substrate having the active layer 25 formed thereon and patterned to form a plurality of data lines formed in a direction perpendicular to the gate lines. Each data line has a data pad 26c at an end thereof, source electrode 26a each projected from the data line in a side direction at the gate electrode 21a, and a drain electrode 26b spaced from the source electrode 26a. In patterning the conductive metal, an ohmic contact layer 24a is formed due to over-etching of the second semiconductor layer 24 between the source electrode 26a and drain electrode 26b. Then, a protection film 27 is formed on an entire surface of the lower substrate 20 inclusive of the drain electrode 26b.

Next, referring to FIG. 2D, the protection film 27 is etched by a photo-mask process to form first, second, and third contact holes 29a, 29b, and 29c to the drain electrode 26b, the gate pad 21b and the data pad 26c, respectively. Then, a transparent conductive metal is deposited on the protection film 27 inclusive of the first, second, third contact holes 29a, 29b and 29c, and patterned to form a pixel electrode 28a in the pixel region in contact with the drain electrode 26b through the first contact hole 29a, a gate terminal 28b on the second contact hole 29b and the protection film 27 adjacent to the contact hole 29b in contact with the gate pad 21b, and a data terminal 28c on the third contact hole 29c and the protection film 27 adjacent to the third contact hole 29c in contact with the data pad 26c.

In above processes, five masks are used. In carrying out a pad opening process by forming the second and third contact holes 29b and 29c in the first gate pad 21b and data pad 26c, since there are two layers of the gate insulating film 22 and the protection film 27 on the gate pad 21b and only one layer of the protection film 27 on the data pad 26c, a defect is liable to occur due to a thickness difference in opening the pad. In other words, if etching is carried out until the data pad 26c is exposed, the gate pad 21b may not be opened. Thus, the use of five masks leads to a complicated fabrication process and a defective pad opening.

Consequently, a four mask fabrication process is recently introduced to reduce the number of masks. A related art method for fabricating a TFT array substrate in accordance with a four mask fabrication process will be described. FIG. 3 illustrates an enlarged plan view of a pixel on a TFT array substrate according to related art LCD, and FIG. 4 illustrates sections across lines I-I', II-II', and III-III' in FIG. 3. FIGS. 5A-5D illustrate sections showing the steps of a method for fabricating a TFT array substrate shown in FIG. 4.

Referring to FIGS. 3 and 4, the TFT array substrate includes gate lines 41 and data lines 45 formed on the lower substrate 40 to cross each other with the gate insulating film 42 therebetween, a thin film transistor T formed an every intersection, a pixel electrode 49a formed in a cell region defined by the crossing structure, a gate pad 41b formed at an end of the gate line 41, and a data pad 46 at an end of the data line 45. The thin film transistor T is provided with a gate electrode 41a projected from one side of the gate line 41, a source electrode 45a projected from one side of the data line 45, a drain electrode 45b partly projected from the source electrode 45a and in contact with the pixel electrode 49a, and an active layer 43 forming a channel between the source electrode 45a and the drain electrode 45b. The active layer 43 is formed overlapping with and under the data pad 46, the data line 45, the source electrode 45a, and the drain electrode 45b. The active layer 43 further includes a channel portion between the source electrode 45a and the drain electrode 45b. The ohmic contact layer 44 is disposed on the active layer 43 for ohmic contact with the data pad 46, the data line 45, the source electrode 45a, and the drain electrode 45b.

The thin film transistor T supplies a pixel voltage signal to the data line 45 in response to the gate signal supplied to the gate line is charged to the pixel electrode 49a. The pixel electrode 49a contacts the drain electrode 45b of the thin film transistor T through the first contact hole 48a, which passes through the protection film 47. The pixel electrode 49a causes a potential difference with a common electrode on the upper substrate (not shown) due to the charged pixel electrode. The potential difference causes the liquid crystal between the thin transistor substrate and the upper substrate to rotate by dielectric anisotropy, to transmit a light incident thereto from a light source (not shown) through the pixel electrode 49a toward the upper substrate.

The gate line 41 is connected to the gate driver (not shown) through the gate pad portion. The gate pad portion is provided with a gate pad 41b extended from the gate line 41, and a gate pad terminal 49b connected to the gate pad 41b through the second contact hole 48b passed through the gate insulating film 42 and the protection film 47. The data line 45 is connected to the data driver (not shown) through the data pad portion. The data pad portion is provided with a data pad 46 extended from the data line 45, and a pad terminal 49c connected to the data pad 46 through the third contact hole 48c passed through the protection film 47. The gate pad 41b and data pad 46 are connected to a TCP output pad (not shown) having a drive integrated circuit mounted thereon through an anisotropic conductive film.

A related art method for fabricating the foregoing TFT array substrate by using the four mask fabrication process will now be described in detail.

Referring to FIG. 5A, a gate metal layer is deposited on the lower substrate 40 by sputtering and the like, and patterned by photolithography and etching using a first mask to form a gate line 41 in one direction. A gate electrode 41a is projected from one side of the gate line 41 and a gate pad 41b at an end of the gate line 41. The gate metal layer is a single layer of Cr, Mo, or Al or a double layer.

Referring to FIG. 5B, a gate insulating film 42, an active layer 44, an ohmic contact layer 43, and data patterns are formed on the lower substrate 40 in succession inclusive of the gate patterns (gate line 41, gate electrode 41a, and gate pad 41b). Using the data portion, a data pad 46 is formed at the data pad portion. In more detail, a gate insulating film 42, an amorphous silicon layer, an $n^+$ amorphous silicon layer, and data metal layer are formed in succession on the lower substrate 42 having gate patterns formed thereon by deposition, such as PECVD, or sputtering. A photoresist pattern is formed on a data metal layer with a second mask by photolithography. In this instance, a refractive exposure mask has a refractive exposure portion at a channel portion of the thin film transistor for making a height of the photoresist pattern at the channel portion lower than other data pattern part. Then, a wet etching is carried out using the photoresist pattern to form data patterns inclusive of the data line 45, the source line 45a, and the drain electrode 45b integrated with the source electrode 45a. Then, a dry etching is carried out using the same photoresist pattern to pattern the $n^+$ amorphous silicon layer, and the amorphous silicon layer at the same time to form an ohmic contact layer 44 and the active layer 43. Next, the photoresist pattern having a relatively low height in the channel portion is removed by ashing, and the data pattern and the ohmic contact layer 44 are dry etched. Accordingly, the active layer 43 in the channel portion is exposed to separate the source electrode 45*a* and the drain electrode 45*b*. Then, the photoresist pattern left on the data pattern portion is removed by stripping.

In the foregoing process, the photoresist pattern is formed in the data pad portion, and the data pad 46 having the amorphous silicon layer, the n$^+$ amorphous silicon layer, and the data metal layer stacked thereon is formed as the wet and dry etching are carried out. The gate insulating film 42 is formed of an inorganic insulating material, such as silicon oxide SiOx, or silicon nitride SiNx. The data metal layer is formed of Mo, Ti, Ta, or an Mo alloy.

Referring to FIG. 5C, a protection film 47 is formed on an entire surface of the lower substrate 40 inclusive of the data line 45 by deposition, such as PECVD or the like, and etched with a third mask by photolithography and etching to form a first to a third contact holes 48*a*, 48*b*, and 48*c*. The first contact hole 48*a* is formed to pass through the protection film 47 and expose the drain electrode 45*b*. The second contact hole 48*b* is formed to pass through the protection film and the gate insulating film 42 and expose the gate pad 41*b*. The third contact hole 48*c* is formed to pass through the protection film 47 and expose the data pad 46. The protection film 47 is formed of an inorganic insulating material, the same as the gate insulating film 42, an acryl group organic compound of a low dielectric constant, or an organic insulating material, such as BCB or PFCB, or the like.

Referring to FIG. 5D, transparent electrode patterns are formed on the protection film 47. A transparent electrode material is deposited on an entire surface of the protection film 47 by deposition, such as sputtering. Then, the transparent electrode material is patterned with a fourth mask by photolithography and etching to form transparent electrode patterns inclusive of the pixel electrode 49*a*, the gate pad terminal 49*b*, and the data pad terminal 49*c*. The pixel electrode 49*a* is electrically connected to the drain electrode 45*b* through the first contact hole 48*a*. The gate terminal 49*b* is electrically connected to the gate pad 41*b* through the second contact hole 48*b*. The data pad terminal 49*c* is electrically connected to the data pad 46 through the third contact hole 48*c*.

Thus, in the related art TFT substrate and a method for fabricating the same, the employment of a four mask process permits a reduced fabrication process and saves production cost proportionately thereto as compared with the case of employing a five mask process. However, even if the thin film transistor substrate is fabricated using the four mask process, a contact hole forming process is required for opening the gate pad and the data pad formed at ends of the gate line and data line. Moreover, in formation of the contact holes, like the five mask process, even if removal of only the protection film is required in a portion over the data pad, removal of two layers of the gate insulating film and the protection film is required in a portion over the gate pad, thereby causing a defective pad opening. Thus, even if the fabrication process is simplified by reducing a number of masks, there is a problem of a defective opening in opening gate pad and data pad.

SUMMARY OF THE INVENTION

Accordingly, the present invention is directed to a method for fabricating a liquid crystal display panel that substantially obviates one or more of the problems due to limitations and disadvantages of the related art.

An object of the present invention is to provide a method for fabricating a liquid crystal display panel which can simplify a fabrication process and resolving a defective pad opening.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating a liquid crystal display panel comprises the steps of forming a thin film transistor array on a lower substrate, the thin film transistor array having gate lines, data lines, data pads, thin film transistors and pixel electrodes; forming a color filter array on an upper substrate; bonding the upper substrate and lower substrate together; cutting the bonded upper and lower substrates into cells; and exposing the gate pads and the data pads at ends of the gate lines and the data lines on the lower substrate of the bonded upper and lower substrates.

In another aspect, a method for fabricating a liquid crystal display panel comprises the steps of forming a thin film transistor array substrate including a screen region having gate lines, data lines, thin film transistors, and pixel electrodes, a pad region having gate pads, an overetch prevention pattern formed overlapped with a gate insulating film in an outer portion of each gate pad, and data pads, data pad protection electrodes each on a respective data pad, and a protection film on an entire surface of the screen region and the pad region; forming a color filter array substrate; bonding the thin film transistor array substrate and the color filter array substrate so that the pad region remains uncovered; etching a portion of the protection film and the overetch prevention pattern of the pad region to partially expose the gate pads and the data pad protection electrodes, and to form gate holes in the gate insulating film over corresponding gate pads.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
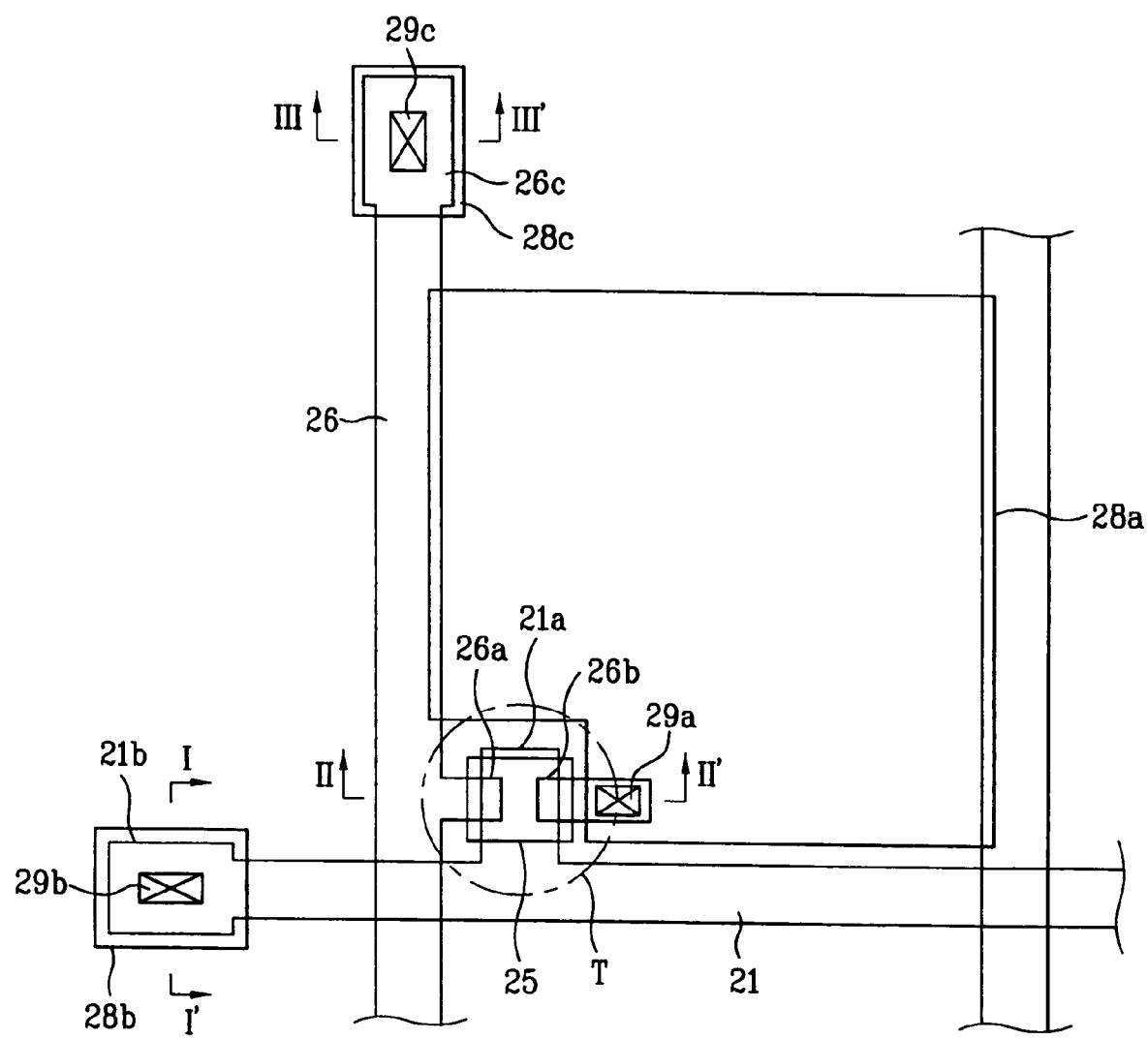
FIG. 1 illustrates an enlarged plan view of a pixel on a thin film transistor array substrate in a related art liquid crystal display panel.
Figure 2A:
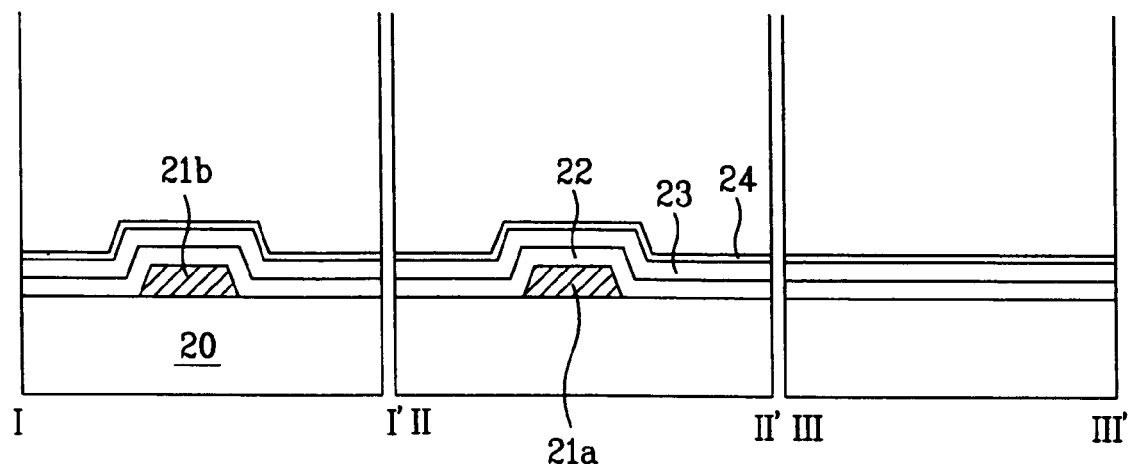
FIGS. 2A-2D illustrate sections across lines I-I', II-II' and III-III' in FIG. 1 showing the steps of a fabrication method.
Figure 2B:
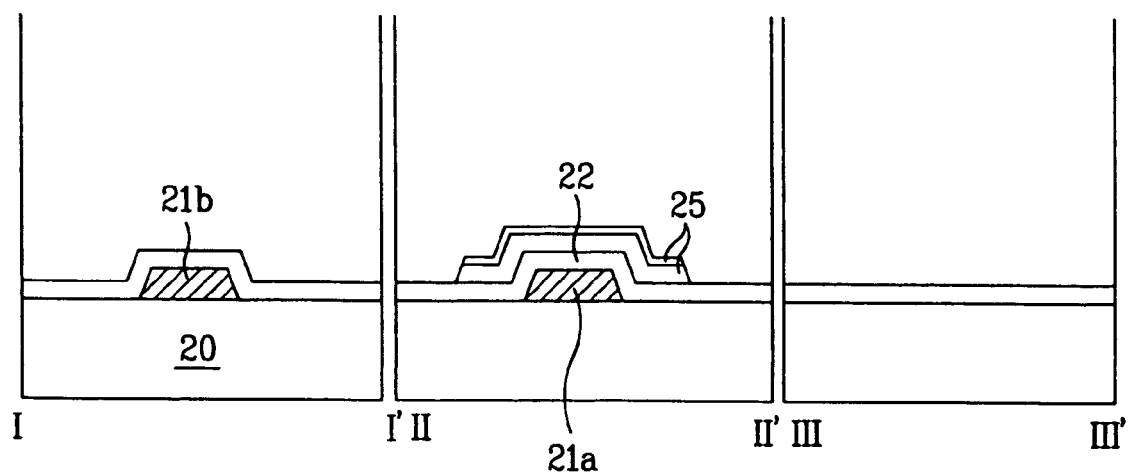
Figure 2C:
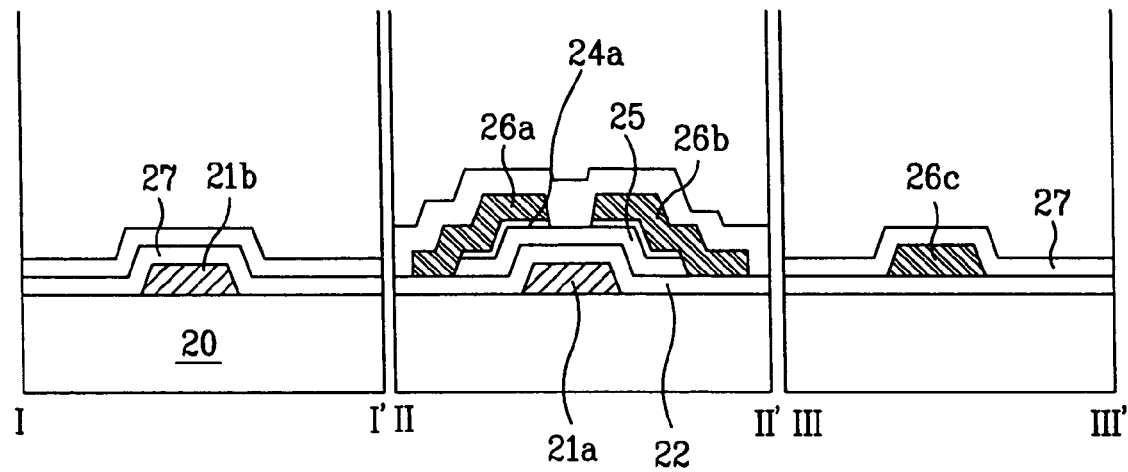
Figure 2D:
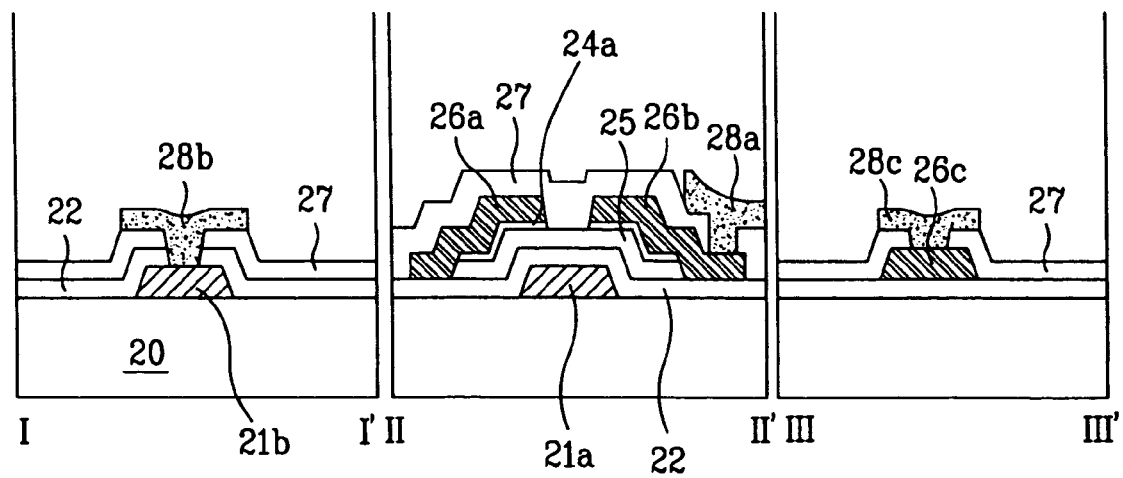
Figure 3:
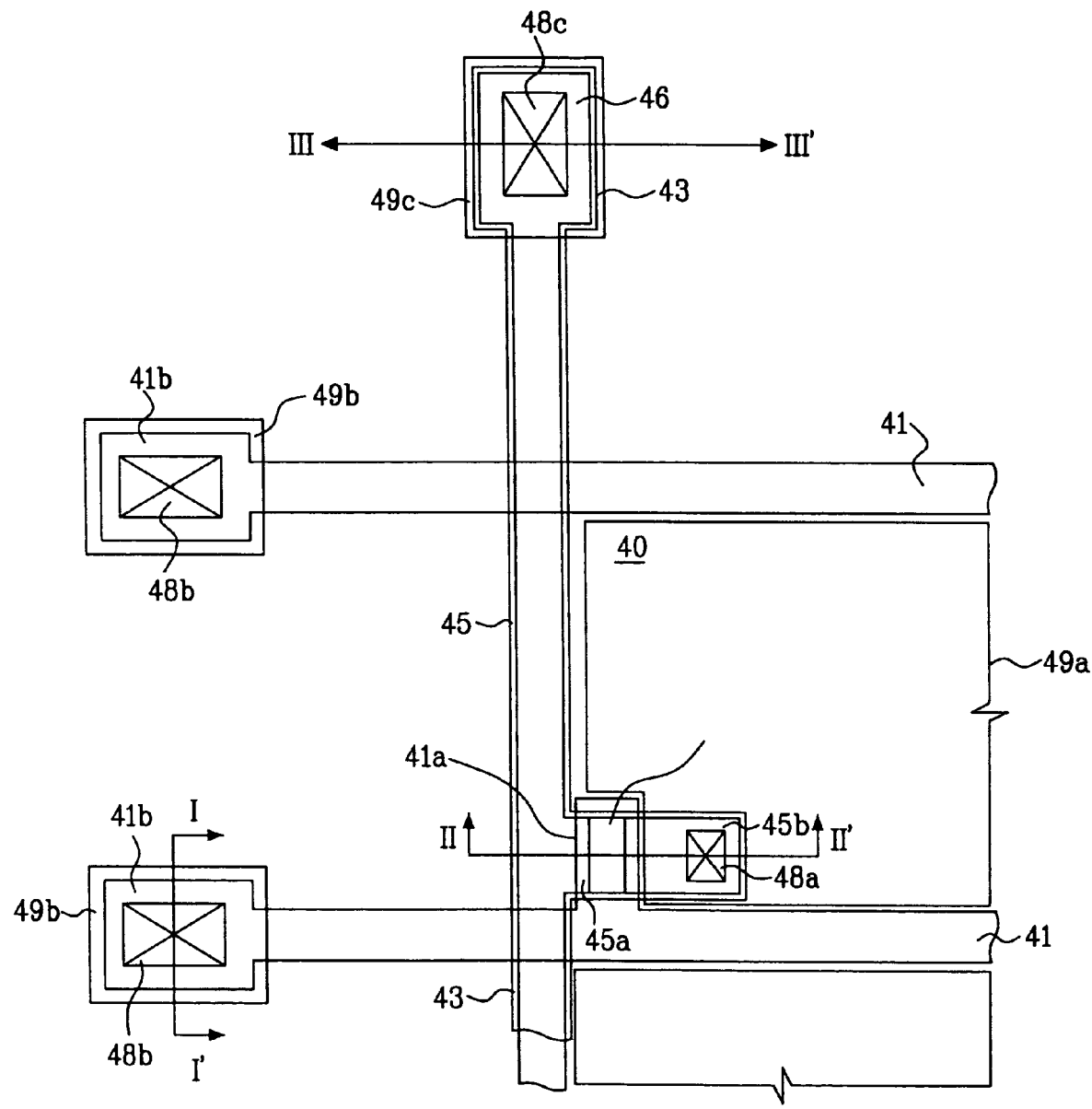
FIG. 3 illustrates an enlarged plan view of a pixel on a TFT array substrate in another related art LCD panel.
Figure 4:
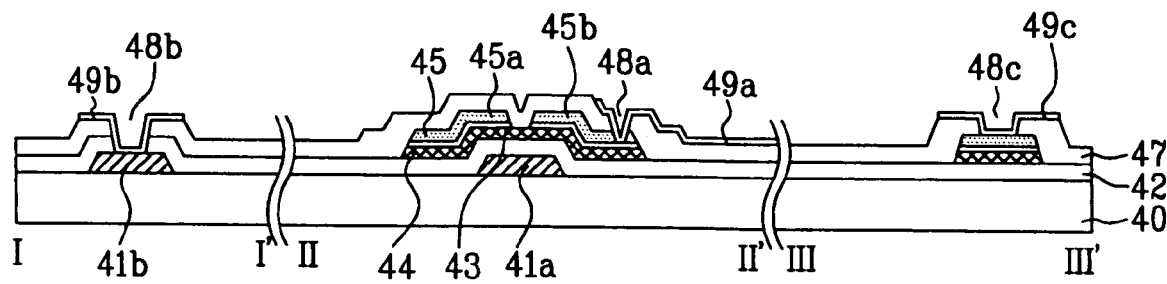
FIG. 4 illustrates sections across lines I-I', II-II', and III-III' in FIG. 3.
Figure 5A:
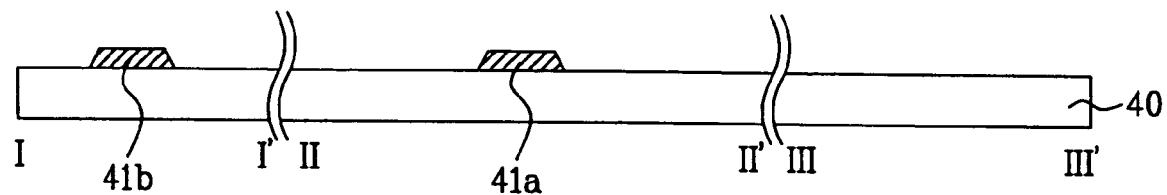
FIGS. 5A-5D illustrate sections showing the steps of a method for fabricating a TFT array substrate shown in FIG. 4.
Figure 5B:
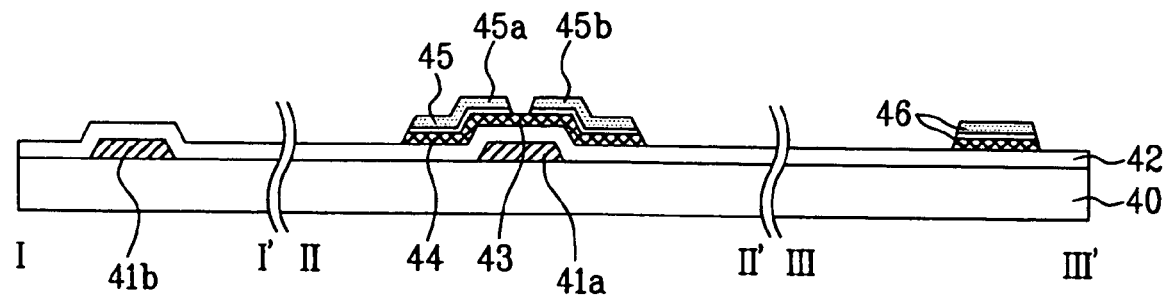
Figure 5C:
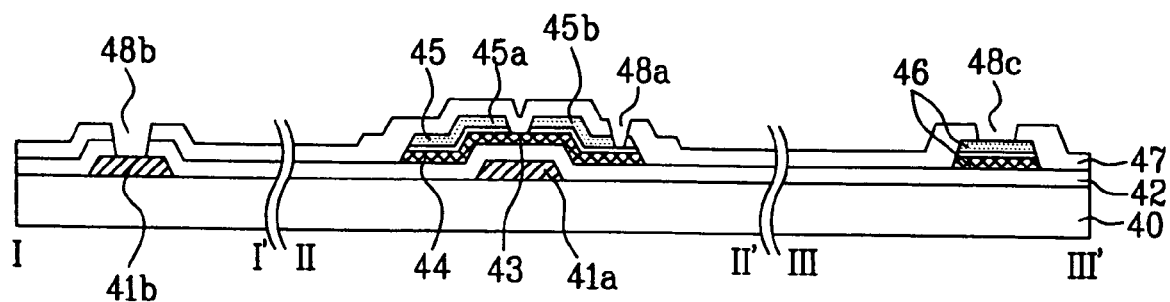
Figure 5D:
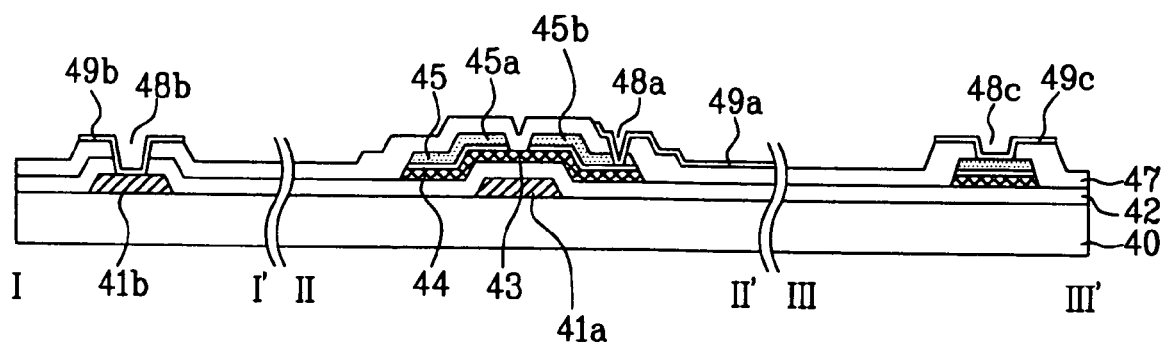
Figure 6A:
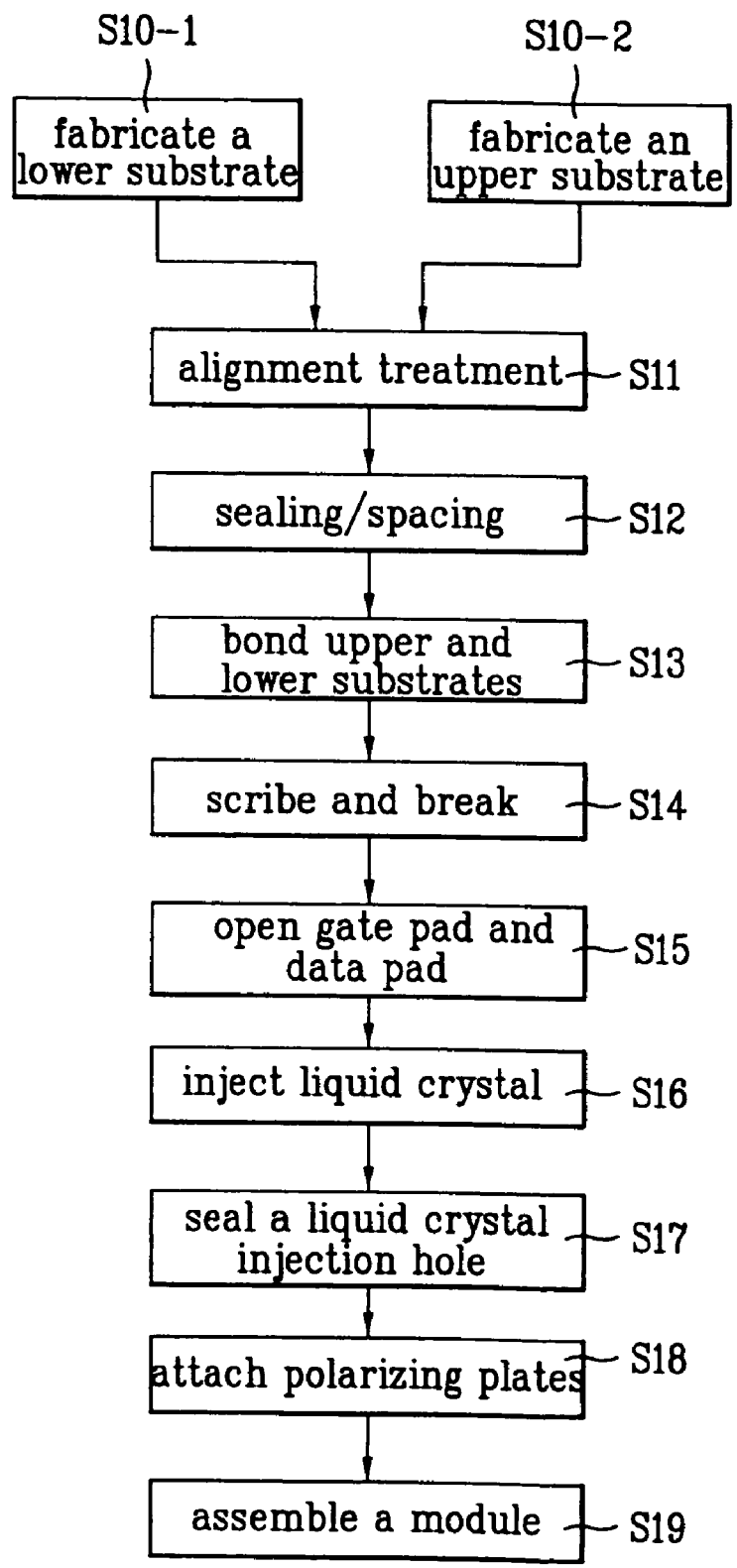
FIGS. 6A and 6B illustrate flow charts each showing the steps of a method for fabricating a liquid crystal display panel in accordance with an exemplary embodiment of the present invention.
Figure 6B:
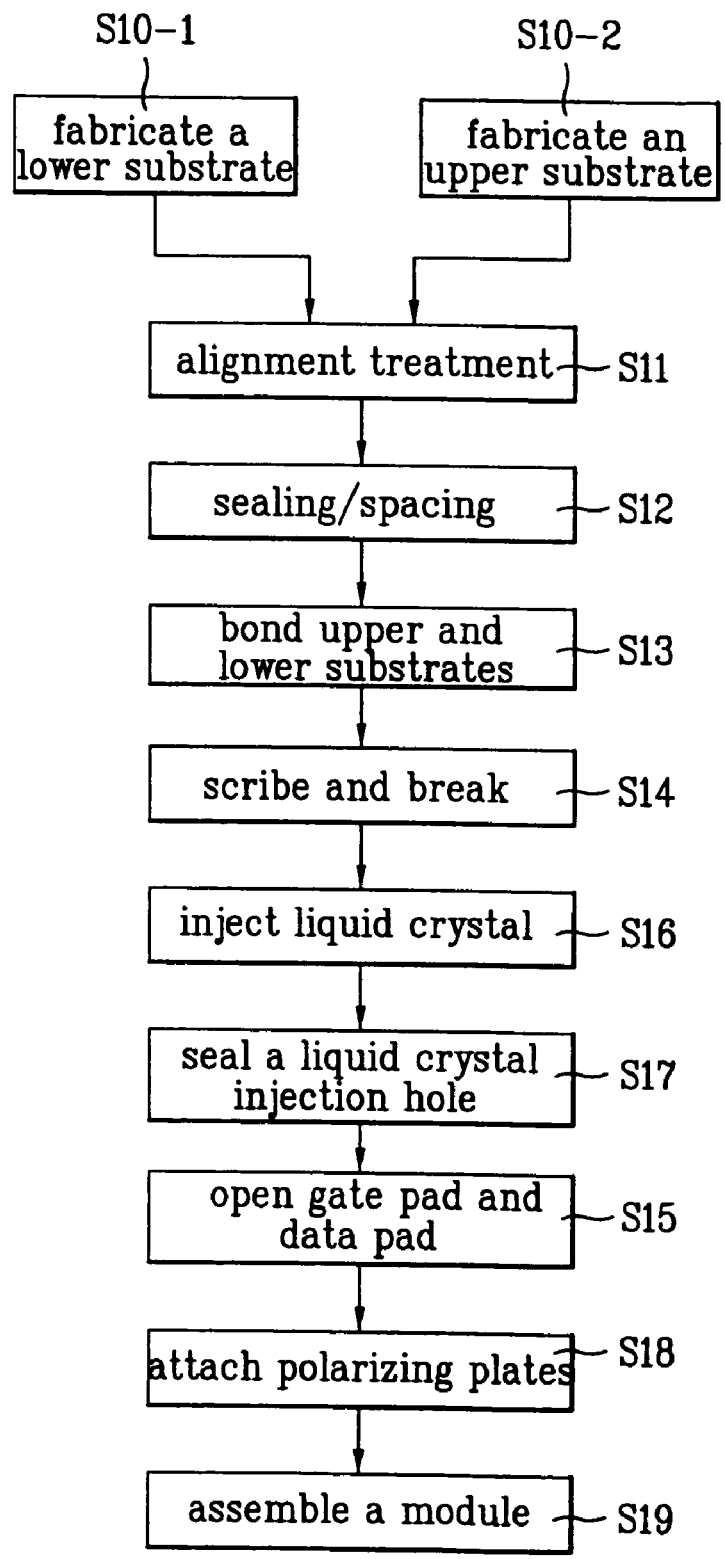

FIGS. 6A and 6B illustrate flow charts each showing the steps of a method for fabricating a liquid crystal display panel in accordance with an exemplary embodiment of the present invention. The liquid crystal display panel includes a lower substrate, an upper substrate, and a liquid crystal panel injected between the upper substrate and a lower substrate. The lower substrate has a plurality of gate lines arranged at fixed intervals and a plurality of data lines arranged at fixed intervals perpendicular to the gate lines formed thereon to form a matrix of pixel regions each with a thin film transistor and a pixel electrode formed therein. The upper substrate has a black matrix layer and a color filter layer formed thereon.

A fabrication process of the LCD panel includes the steps of fabricating a substrate, fabricating a cell, and fabricating a module. A gate pad and a data pad are at ends of the gate line and the data line on the lower substrate. Referring to FIGS. 6A and 6B, the present invention suggests carrying out opening of the gate pad and the data pad, not during fabrication of the lower substrate (the TFT array substrate), but after bonding of the upper and lower substrates.

The substrate fabrication process includes a process for fabricating a lower substrate (a TFT array substrate) (S10-1) of a glass substrate, and a process of fabricating an upper substrate (a color array substrate) (S10-2) of a glass substrate. The process for fabricating a lower substrate is a process for forming thin film transistor array inclusive of gate lines, data lines, thin film transistors, pixel electrodes on the lower substrate. The process for fabricating an upper substrate is a process for forming a R(Red), G(Green) and B(Blue) color filter layer of dye or pigment on the upper substrate having a light shielding film formed thereon, and forming a common electrode (ITO:Indium Tin Oxide) on an entire surface of the upper substrate inclusive of the color filter layer.

Referring to FIG. 6A, the process of fabricating a cell includes fabrication of the finished lower and upper substrates into a unit LCD cell state inclusive of the steps of alignment treatment for orientation of liquid crystal molecules (S11), sealing and spacing (S12), bonding of the upper and lower substrates (S13), scribing and breaking (S14), opening of the gate pad and/or data pad (S15), injection of liquid crystal (S16), sealing liquid crystal injection opening (S17), and attachment of a polarizing plate (S18).

In more detail, the process of fabricating a cell includes the steps of alignment treatment (S11) for forming and rubbing an alignment film for uniform orientation of liquid crystal molecules that enables regular liquid crystal driving and provides uniform display characteristics, sealing and spacing (S12) for scattering spacers and forming sealant for maintaining a fixed gap between the lower substrate of which TFT fabrication process is finished and the upper substrate of which color filter fabrication process is finished, bonding of the lower and upper substrates (S13), scribing and breaking (S14) for separating a plurality of cells formed on the lower and upper substrates, opening of the gate pad and/or data pad (S15) for opening a gate pad and data pad of the separated cell, injection of liquid crystal (S16) for injecting liquid crystal between the cell by using capillary tube phenomenon and a pressure difference, sealing liquid crystal injection opening (S17) for sealing the liquid crystal injection hole for blocking flow out of the liquid crystal from the cell having the liquid crystal injected therein, and attachment of a polarizing plate (S18) for attaching polarizing plates on both surfaces of the cell.

Referring to FIG. 6B, the step of opening of the gate pad and/or data pad (S15) may be carried out between the steps of sealing liquid crystal injection opening (S17) and attachment of a polarizing plate (S18). Next, the step of fabricating a module is a process for fabricating a circuit portion for processing signals and connecting the LCD panel and the circuit portion to fabricate a module. As described, the present invention suggests carrying out opening of the gate pad and the data pad on the lower substrate during the cell fabrication process, particularly, after separating into cells by scribing and breaking, or sealing the liquid crystal injection hole. A method for fabricating an LCD panel of the present invention will be described for exemplary embodiments.

Figure 7:
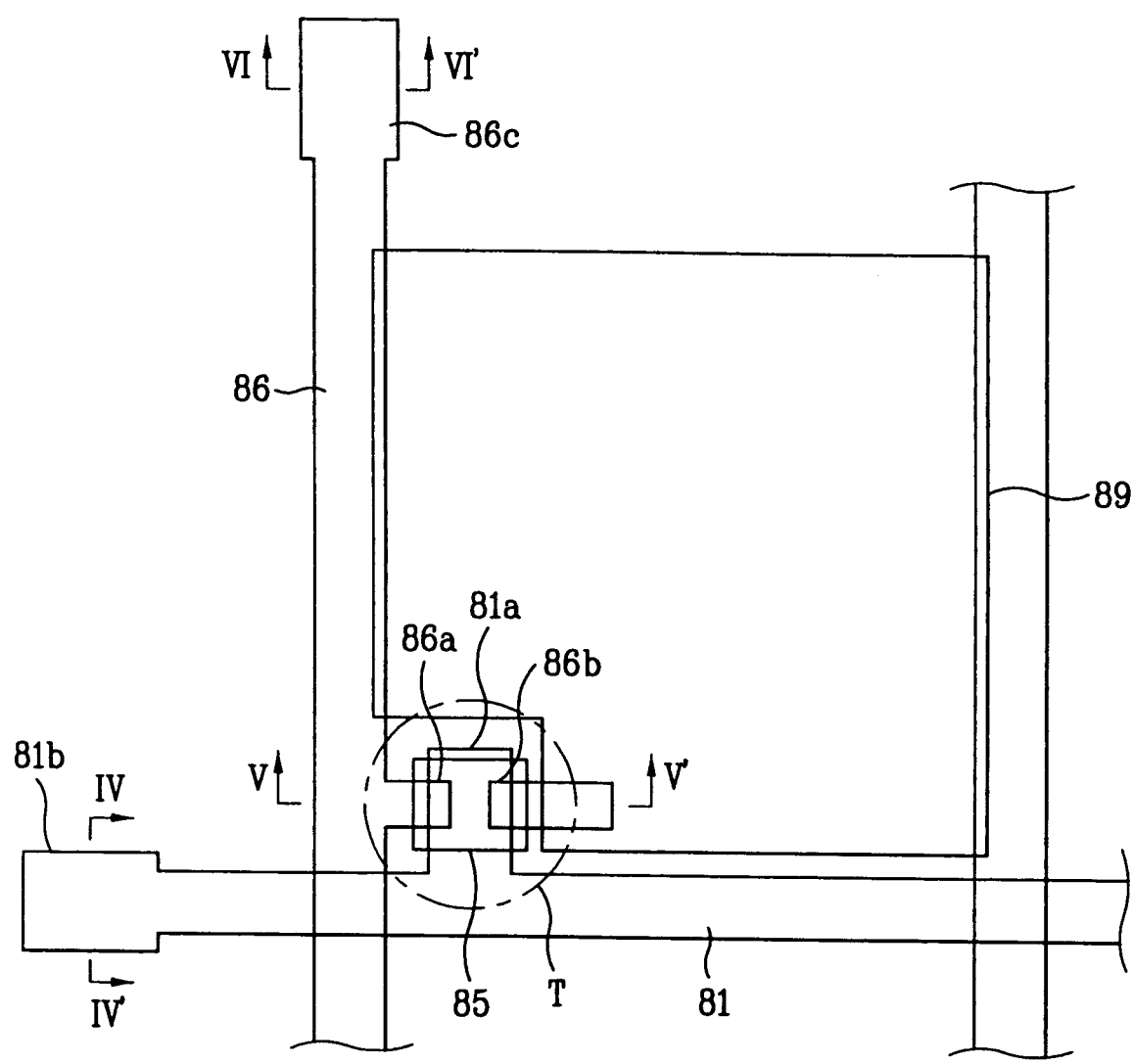
FIG. 7 illustrates an enlarged plan view of a pixel on a TFT array substrate in accordance with a first exemplary embodiment of the present invention.
Figure 8A:
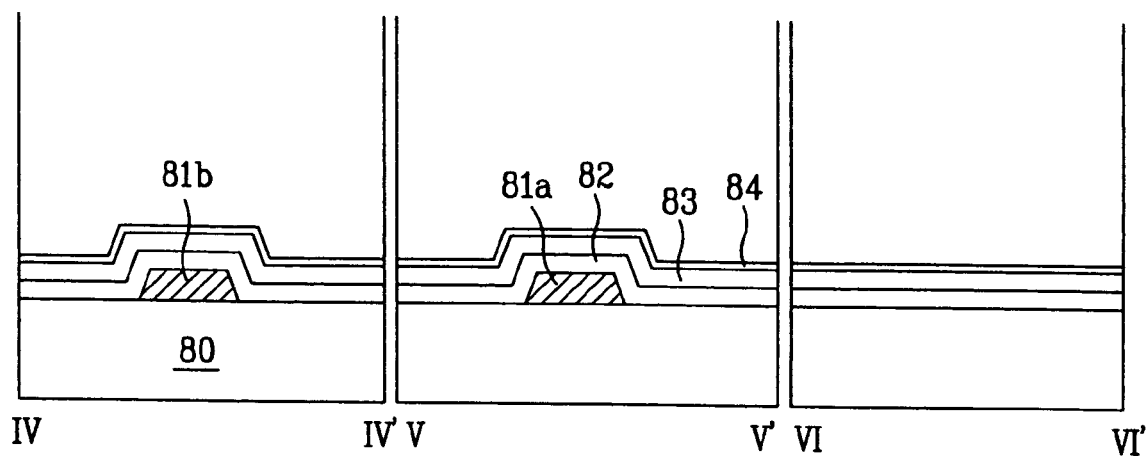
FIGS. 8A-8C illustrate sections across lines IV-IV', V-V', and VI-VI' in FIG. 7 showing the steps of a fabrication method.
Figure 8B:
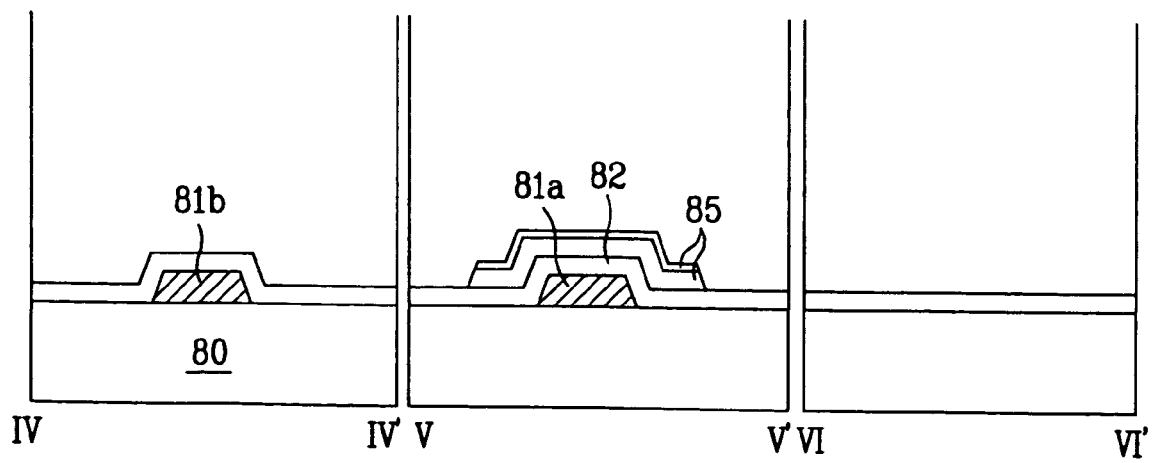
Figure 8C:
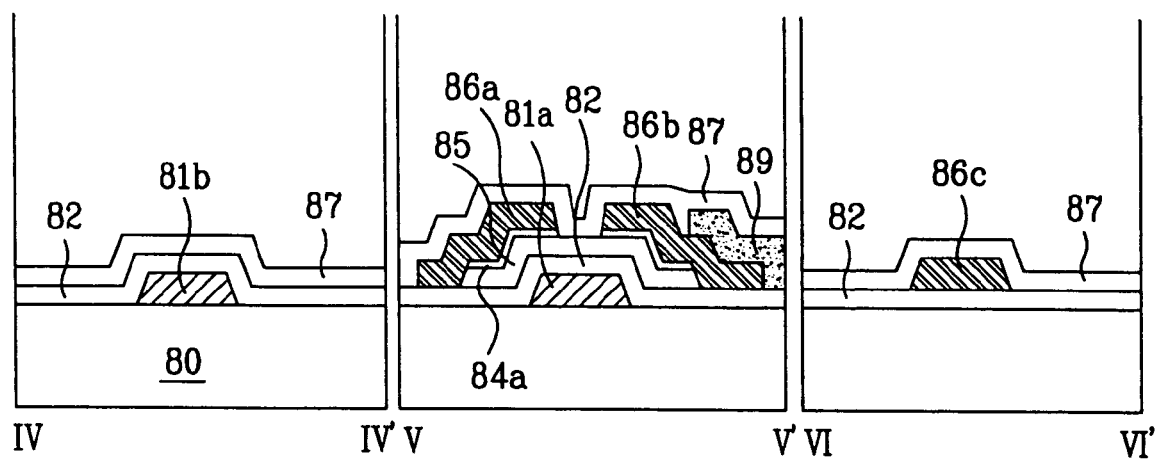
Figure 9:
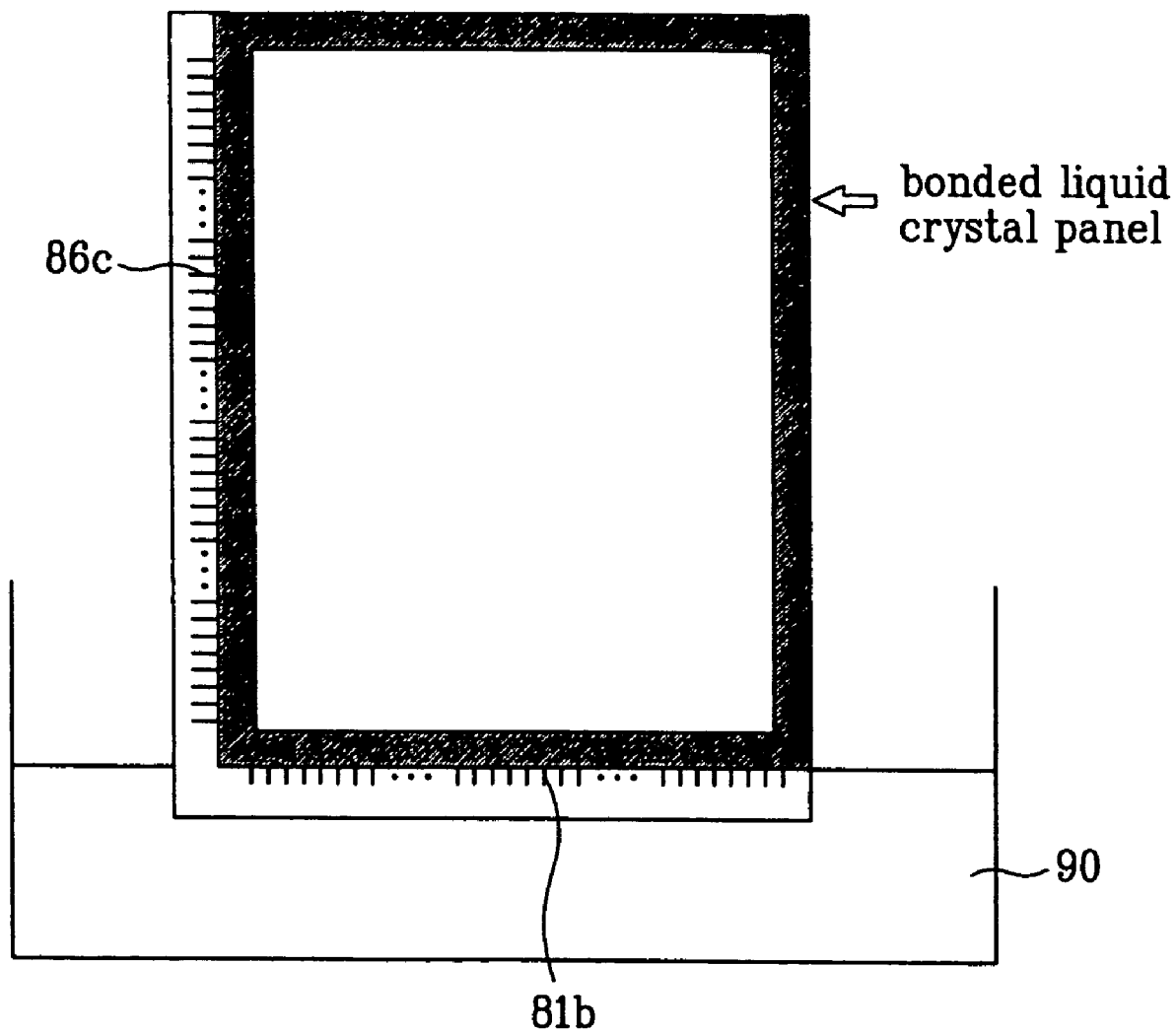
FIG. 9 illustrates a method for opening a gate pad in an LCD panel of the present invention.
Figure 10A:
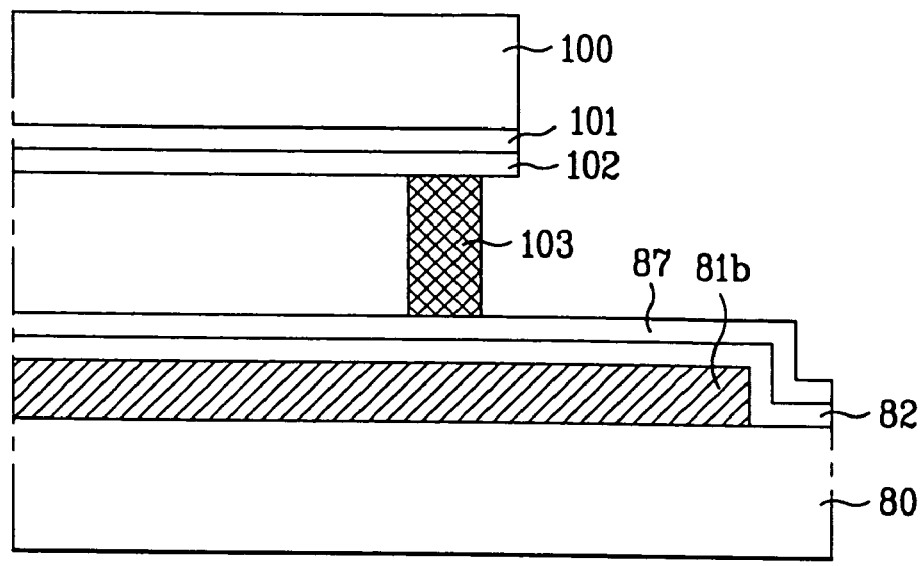
FIGS. 10A and 10B illustrate before and after opening of a gate pad in accordance with a first preferred embodiment of the present invention.
Figure 10B:
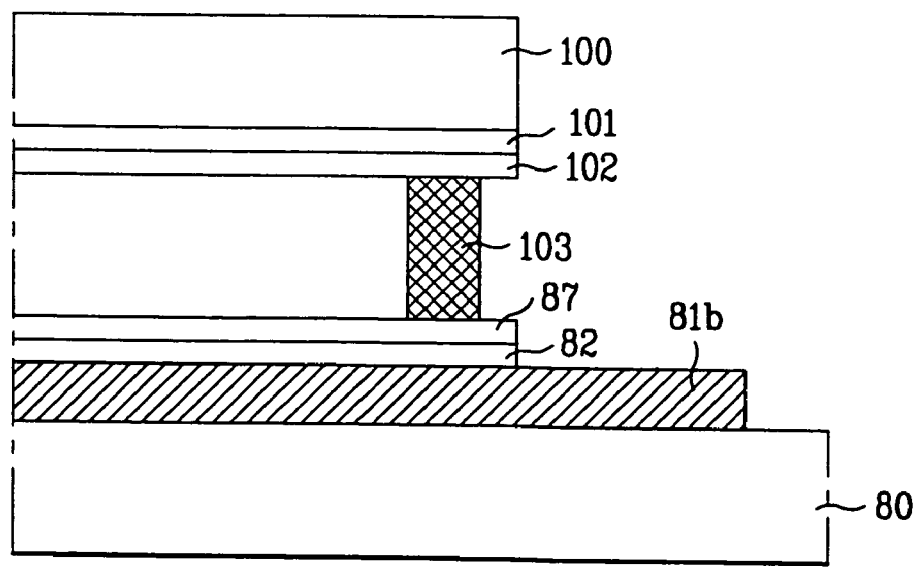
Figure 11:
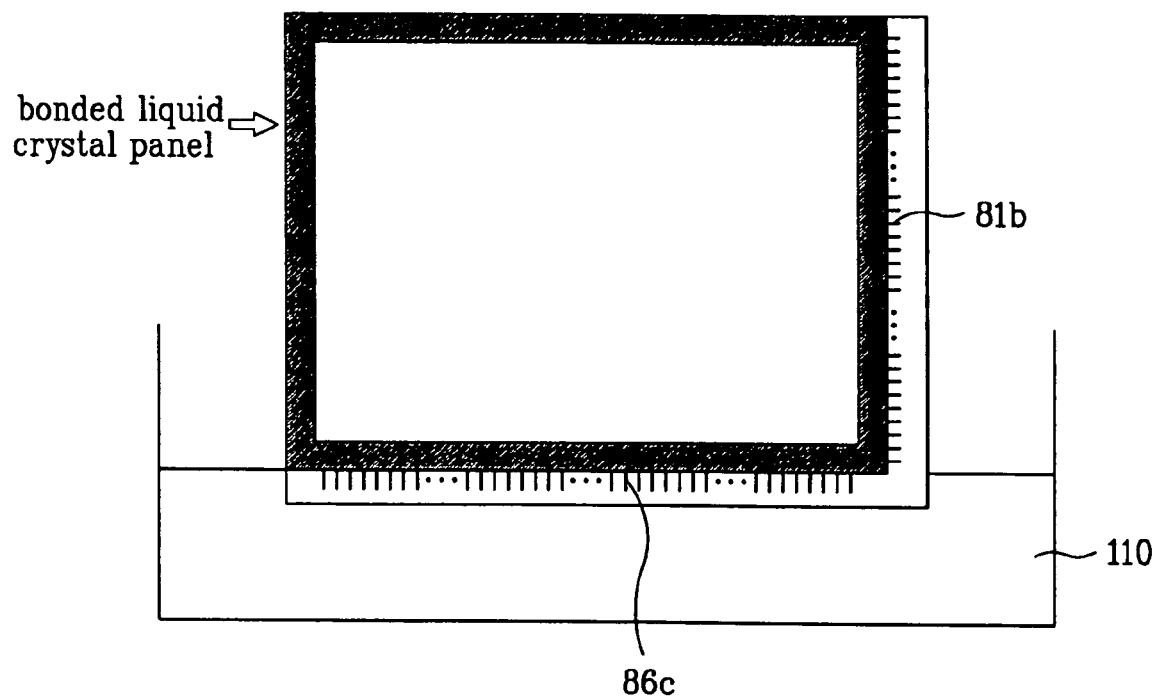
FIG. 11 illustrates a method for opening data pad in an LCD in accordance with an exemplary embodiment of the present invention.
Figure 12A:
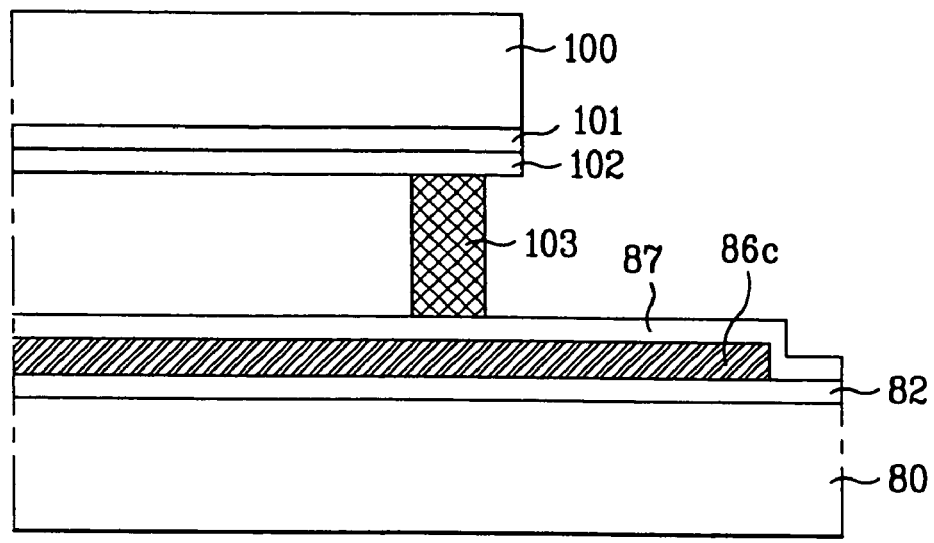
FIGS. 12A and 12B illustrate before and after opening of a data pad in accordance with the first exemplary embodiment of the present invention.
Figure 12B:
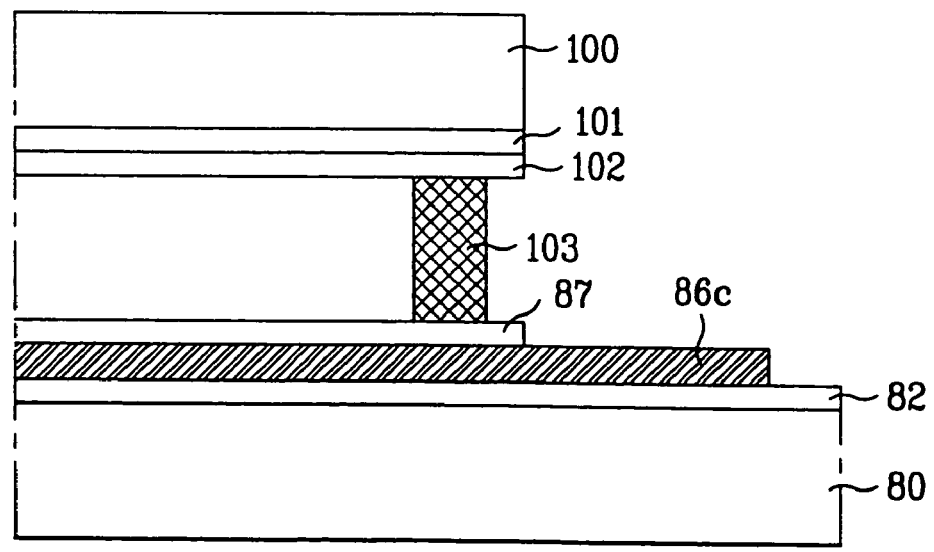

FIG. 7 illustrates an enlarged plan view of a pixel on a TFT array substrate in accordance with a first exemplary embodiment of the present invention, and FIGS. 8A-8C illustrate sections across lines IV-IV', V-V', and VI-VI' in FIG. 7 showing the steps of a fabrication method. FIG. 9 illustrates a method for opening a gate pad in an LCD panel of the present invention, and FIGS. 10A and 10B illustrate before and after opening of a gate pad in accordance with a first exemplary embodiment of the present invention. FIG. 11 illustrates a method for opening data pad in an LCD in accordance with an exemplary embodiment of the present invention, and FIGS. 12A and 12B illustrate before and after opening of a data pad in accordance with a first exemplary embodiment of the present invention. The first exemplary embodiment of the present invention suggests opening the gate pad and data pad in the cell fabrication process after fabrication of the lower substrate in an LCD using five masks.

At first, referring to FIG. 8A, a conductive metal is deposited on a transparent lower substrate 80 and patterned, to form a gate pad 81b having a large end of a predetermined area, a gate line 81 extended in one direction from the gate pad 81b (see FIG. 7), and a gate electrode 81a projected from the gate line 81 in one direction. Next, an insulating film 82, and first and second semiconductor layers (an amorphous silicon layer, and an n+ amorphous silicon layer) 83 and 84 for forming the active layer, are deposited in succession on an entire surface of the substrate having the gate electrode 81a formed thereon.

Referring to FIG. 8B, a mask for forming the active layer is used in patterning the first and second semiconductor layers 83 and 84 to form the active layer 85 of an island form on the gate electrode 81a.

Referring to FIG. 8C, a conductive metal is deposited on an entire surface of the lower substrate 80 having the active layer 85 formed thereon and patterned, to form a data line arranged in one direction crossing the gate line 81 having a data pad formed at one end thereof, a source electrode 86a projected and extended from the data line to one side direction of the gate electrode 81a, and a drain electrode 86b spaced a distance from the source electrode 86a. In patterning the conductive metal, the active layer 85 of the semiconductor layer 84 between the source electrode 86a and the drain electrode 86b are overetched to form an ohmic contact layer 87. Then, a protection film 87 is formed on an entire surface of the lower substrate 80 inclusive of the drain electrode 86b. Thereafter, the protection film is etched to form a drain contact hole 88 (see FIG. 7) on the drain electrode 86b. Next, a transparent conductive metal is deposited on the protection film 87 having the drain contact hole 88 formed therein, and patterned to form a pixel electrode 89 in the pixel region so as to be in contact with the drain contact hole 88. In this instance, since the pixel electrode 89 is formed along the data line overlapped with a predetermined area of the data line 86, an aperture can be increased. After fabricating the lower substrate by the foregoing method, the steps of alignment treatment (S11) for orientation of the liquid crystal molecules, sealing and spacing (S12), bonding of the upper and lower substrates (S13), and scribing and breaking (S14) are carried out, thereby separating the lower substrate into cells. Thereafter, the opening of the gate pad 81b and the data pad 86c is carried out.

At first, referring to FIGS. 9, 10A, and 10B, an exposed portion of the gate pad 81b of the liquid crystal cell is dipped in an insulating film etchant 90 to remove the insulating film 82 and the protection film 87 on the gate pad 81b. States before and after opening the gate pad 81b are shown in FIGS. 10A and 10B.

Next, referring to FIGS. 11, 12A and 12B, the data pad 86c is opened by dipping an exposed portion of the data pad 86c of the liquid crystal cell into an insulating film etchant 110 to remove the protection film 87 on the data pad 86c. States before and after opening the data pad 86c are shown in FIGS. 12A and 12B. Here, the upper substrate 100, the black matrix layer 101, the common electrode 102, and the sealant 103 are shown. The insulating film 82 and the protection film 87 are formed of silicon nitride SiNx and silicon oxide $SiO_2$ respectively. Since etchants for the materials give no damage to the sealant 103, an inside of the cell (i.e., an inside of the LCD panel) does not suffer from damage even if the gate pad and the data pad are dipped into the insulating film etchant.

After opening the gate pad 81b and the data pad 86c, the steps of injecting liquid crystal into the cell (S16) by using capillary tube phenomenon and a pressure difference, sealing a liquid crystal injection opening (S17) to seal the liquid crystal injection hole and block the liquid crystal from the cell having the liquid crystal injected therein, and for attaching polarizing plates on both surfaces of the cell (S18) are carried out. The foregoing opening of the gate pad 81b and the data pad 86c is carried out, not in the substrate fabrication process, but rather in the cell fabrication process, such as after separating cells, injecting the liquid crystal, and sealing the injection hole, as shown in FIG. 6B. Alternatively, the opening of the gate pad 81b and the data pad 86c may be made by an atmospheric plasma etching in which plasma is directed to the gate pad 81b and the data pad 86c through a nozzle, or laser etching in which the gate pad and the data pad are etched with a layer beam directly. Thus, the opening of the gate pad 81b and the data pad 86c is carried out after bonding the upper and lower substrates.

Figure 13:
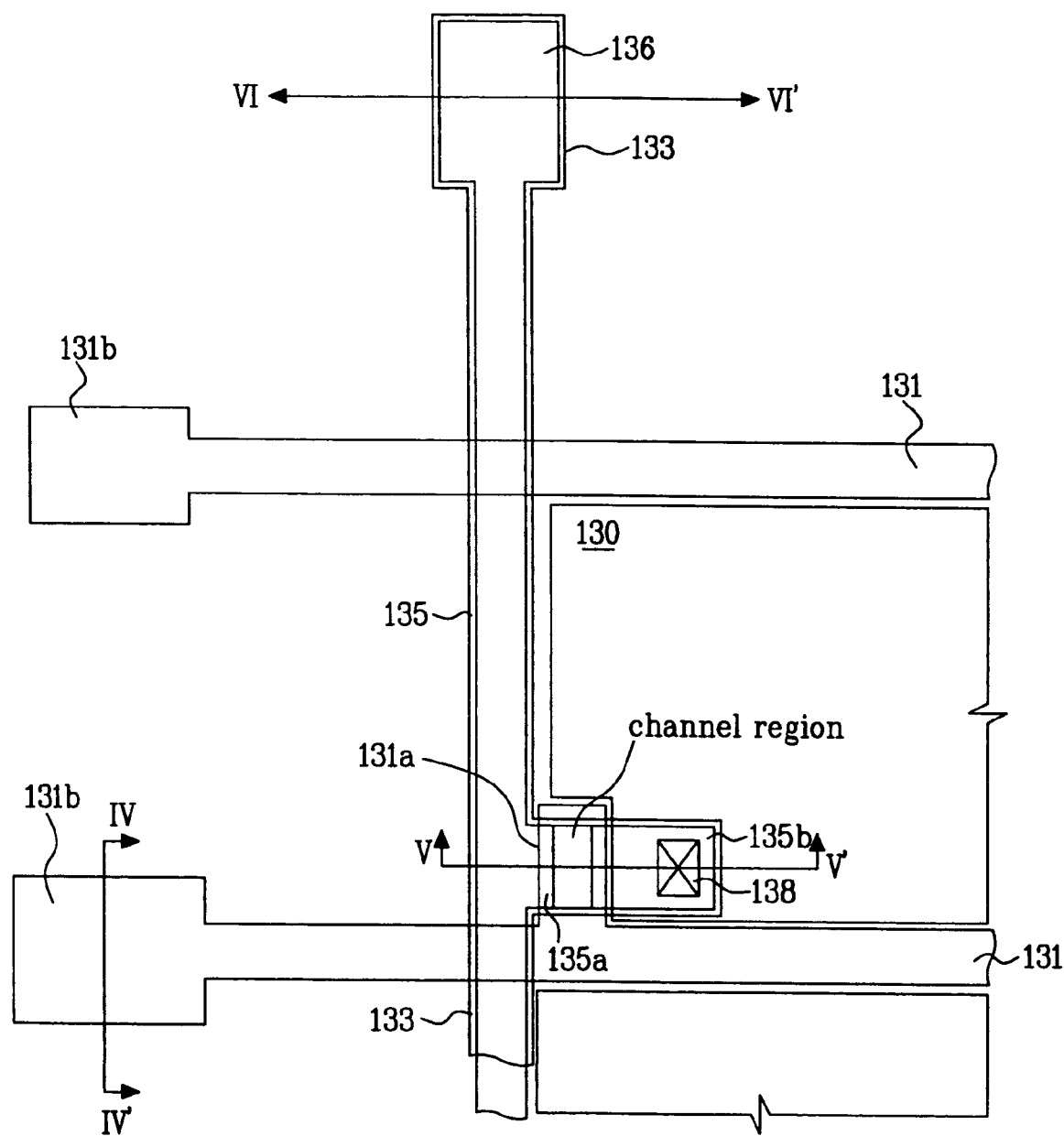
FIG. 13 illustrates an enlarged plan view of a pixel on a TFT array substrate in accordance with a second exemplary embodiment of the present invention.

FIG. 13 illustrates an enlarged plan view of a pixel on a TFT array substrate in accordance with a second exemplary embodiment of the present invention. FIGS. 14A-14D illustrate sections across lines IV-IV', V-V', and VI-VI' in FIG. 13 showing the steps of a fabrication method. In the second exemplary embodiment of the present invention, four masks are used in fabrication of the lower substrate (the thin film transistor array substrate), of which fabrication method is as follows.

Figure 14A:
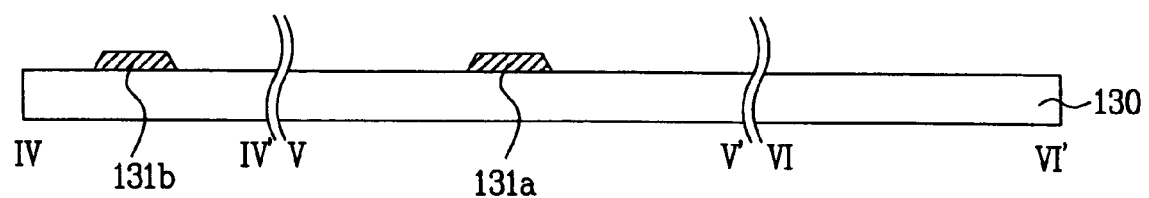
FIGS. 14A-14D illustrate sections across lines IV-IV', V-V', and VI-VI' in FIG. 13 showing the steps of a fabrication method.

Referring to FIG. 14A, a gate metal layer is formed on the lower substrate 130 by deposition, such as sputtering, and patterned with a first mask by photolithography and etching, thereby forming a gate line 131 (see FIG. 13) in one direction. A gate electrode 131a is formed projected from one side of the gate line 131, and a gate pad 131b is formed at one end of the gate line 131. The gate metal layer is a one or two layer of Cr, Mo, or Al.

Figure 14B:
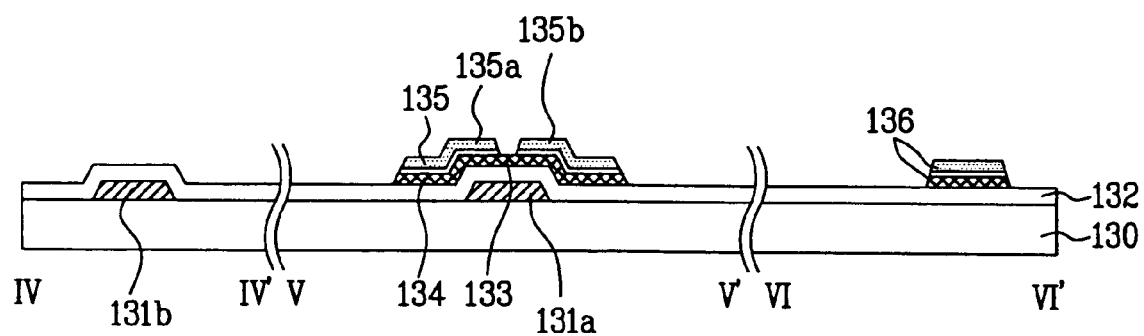

Referring to FIG. 14B, a gate insulating film 132, an active layer 133, an ohmic contact layer 134 and data patterns are formed on the lower substrate 130 inclusive of the gate patterns (the gate line 131, the gate electrode 131a, and the gate pad 131b) in succession. A data pad 136 is also formed in the data pad portion. In more detail, the gate insulating film 132, the first and second semiconductor layers (an amorphous silicon layer and an n+ amorphous silicon layer) and a data metal layer are formed on the lower substrate 132 having the gate patterns formed thereon in succession by deposition, such as PECVD, or sputtering. A photoresist pattern (not shown) is formed on the data metal layer with a second mask by photolithography. Here, using a refractive exposure mask having a refractive exposure portion at a channel portion of the thin film transistor as the second mask, the photoresist pattern at the channel portion has a height lower than other data pattern portions. Then, wet etching is carried out using the photoresist pattern to pattern the data metal layer and to form data patterns including a data line 135, a source electrode 135a, and a drain electrode 135b integrated with the source electrode 135a. Dry etching is carried out using the same photoresist pattern to pattern the n+ amorphous silicon layer and the amorphous silicon layer at the same time, thereby forming the ohmic contact layer 134 and the active layer 133. After the photoresist pattern having a height relatively lower in the channel portion is removed by ashing, the data pattern and the ohmic contact layer 134 in the channel portion are etched by dry etching. Accordingly, the active layer 133 in the channel portion is exposed to separate the source electrode 135a and the drain electrode 135b. The photoresist pattern left on the data pattern portion is stripped off. In the foregoing process, the photoresist pattern is also formed in the data pad portion. The data pad 136 having the amorphous silicon layer, the n+ amorphous silicon layer, and the data metal layer stacked thereon is formed as the wet and dry etching are carried out. The gate insulating film 132 is formed of an inorganic insulating material, such as silicon oxide SiOx, or silicon nitride SiNx. The data metal layer is formed of Mo, Ti, Ta, or an Mo alloy.

Figure 14C:
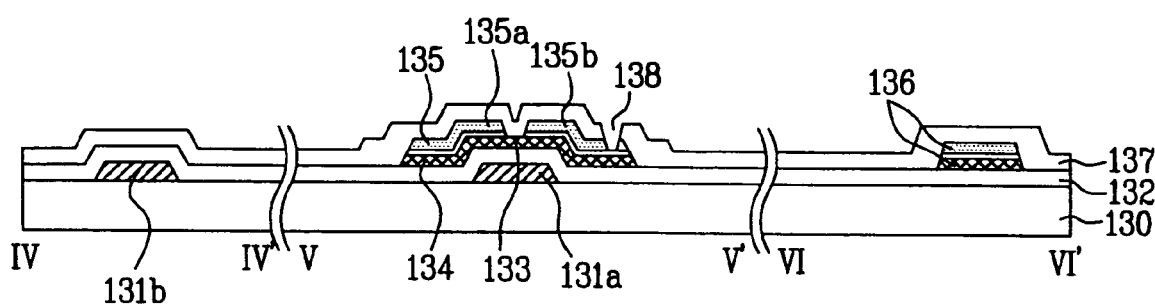

Referring to FIG. 14C, a protection film 137 is formed on an entire surface of the lower substrate 130 including the data line 135 by deposition, such as PECVD or the like, and etched with a third mask by photolithography and etching, thereby forming a contact hole 138. The contact hole 138 (see FIG. 13) is formed in the protection film 137 to expose the drain electrode 135b. The protection film 47 is formed of an inorganic insulating material, such as the same as the gate insulating film 132, an acryl group organic compound of a low dielectric constant, or an organic insulating material (such as BCB or PFCB, or the like).

Figure 14D:
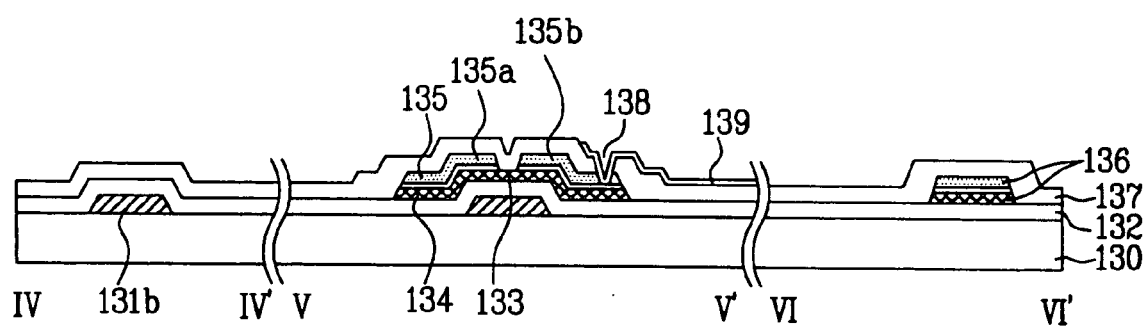

Referring to FIG. 14D, a transparent electrode material is deposited on an entire surface of the protection film 137 by deposition, such as sputtering. Then, the transparent electrode material is patterned with a fourth mask by photolithography and etching, thereby forming a pixel electrode 139 in a pixel region. The pixel electrode 139 is electrically connected to the drain electrode 135b through the contact hole 138. The transparent electrode is formed of Indium Tin Oxide (ITO), Tin Oxide (TO), or Indium Zinc Oxide (IZO). In this instance, by forming the pixel electrode 139 along the data line 135, overlapped with a predetermined area of the data line 135, an aperture can be increased. After fabricating the lower substrate (the thin film transistor array substrate) by the foregoing method, the steps of performing an alignment treatment (S11), sealing and spacing (S12), bonding of the upper and lower substrates (S13), and scribing and breaking (S14) are carried out to separate the lower substrate into cells. Thereafter, the opening of the gate pad 131b and the data pad 136c is carried out by dipping into insulating film etchant. Fabrication processes thereafter are similar to these of the first exemplary embodiment. In this instance, as described in the first exemplary embodiment, as an alternative to dipping into etchant, the opening of the gate pad 131b and the data pad 136 may be made by an atmospheric plasma etching in which plasma is directed to the gate pad and the data pad through a nozzle, or laser etching in which the gate pad and the data pad are etched with a layer beam directly.

Figure 15:
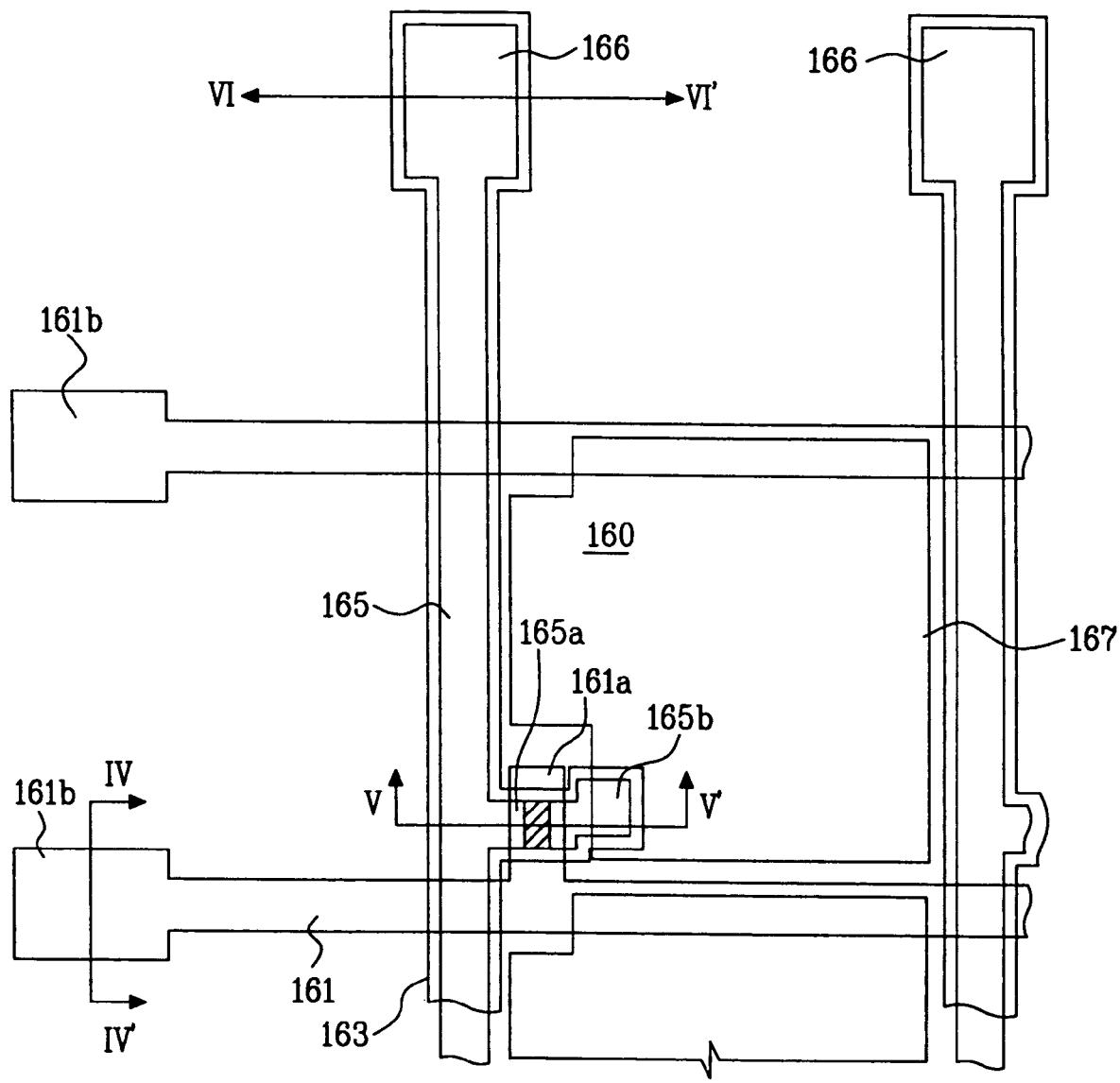
FIG. 15 illustrates an enlarged plan view of a pixel on a TFT array substrate in accordance with a third exemplary embodiment of the present invention.
Figure 16A:
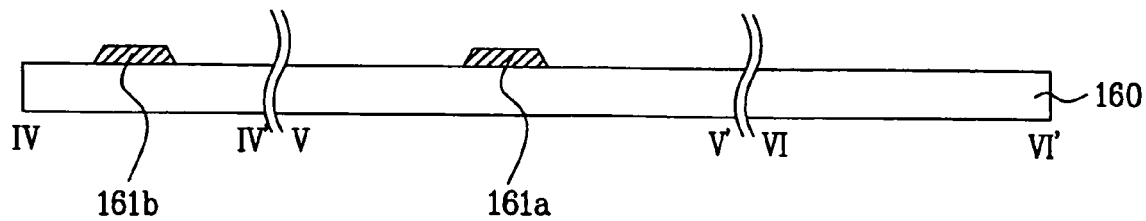
FIGS. 16A-16C illustrate sections across lines IV-IV', V-V', and VI-VI' in FIG. 13 showing the steps of a fabrication method.
Figure 16B:
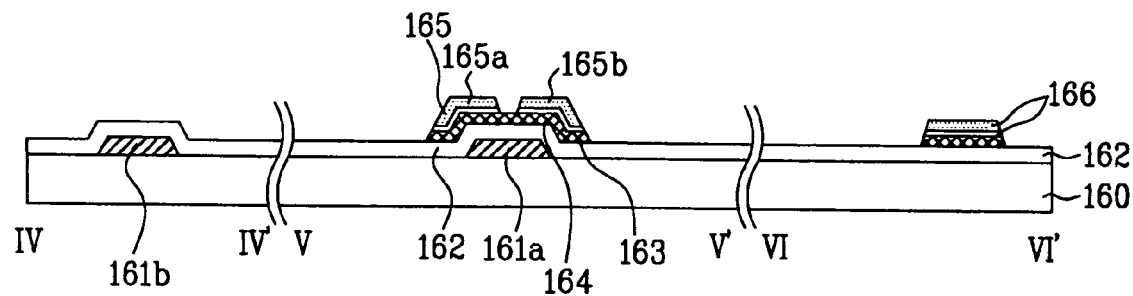
Figure 16C:
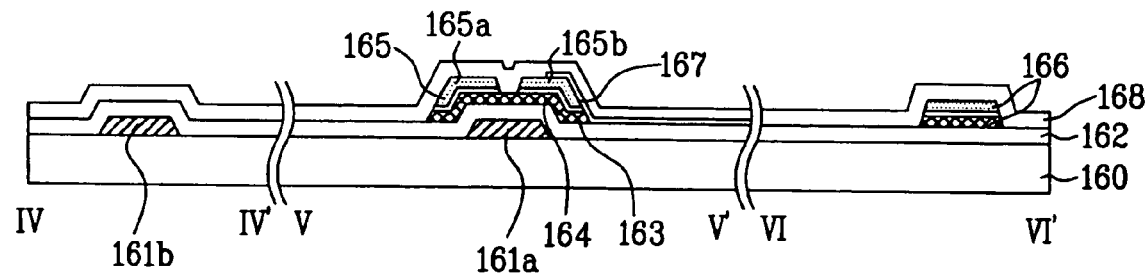

FIG. 15 illustrates an enlarged plan view of a pixel on a TFT array substrate in accordance with a third exemplary embodiment of the present invention, and FIGS. 16A-16C illustrate sections across lines IV-IV', V-V', and VI-VI' in FIG. 15 showing the steps of a fabrication method.

Figure 17A:
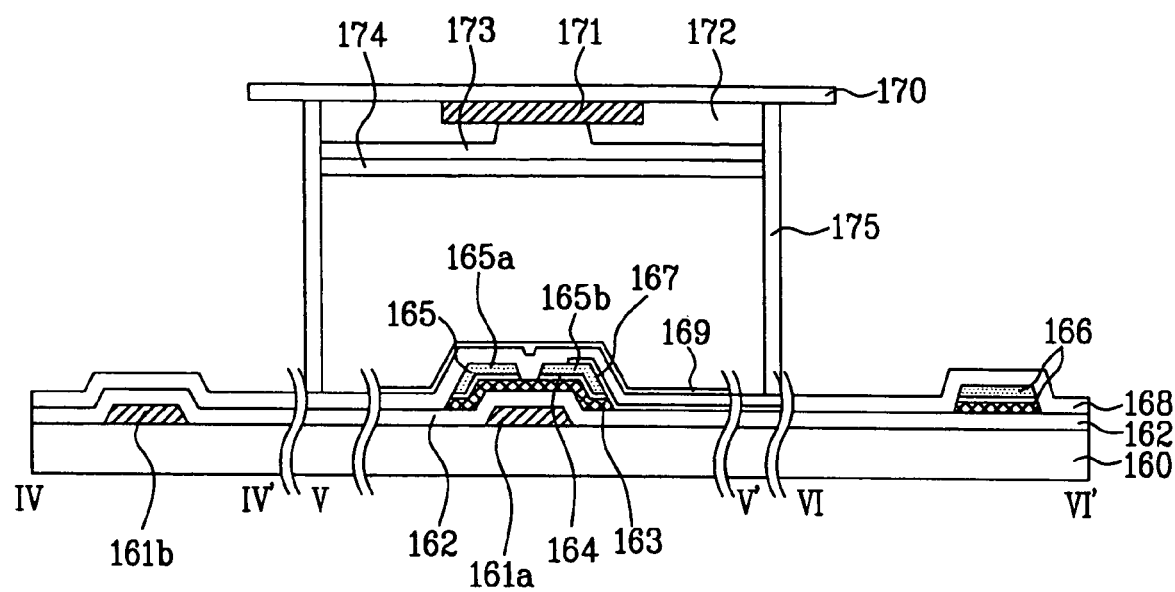
FIG. 17A illustrates a section showing the step of bonding a TFT array substrate and a color filter array substrate of an LCD panel in accordance with the third exemplary embodiment of the present invention.
Figure 17B:
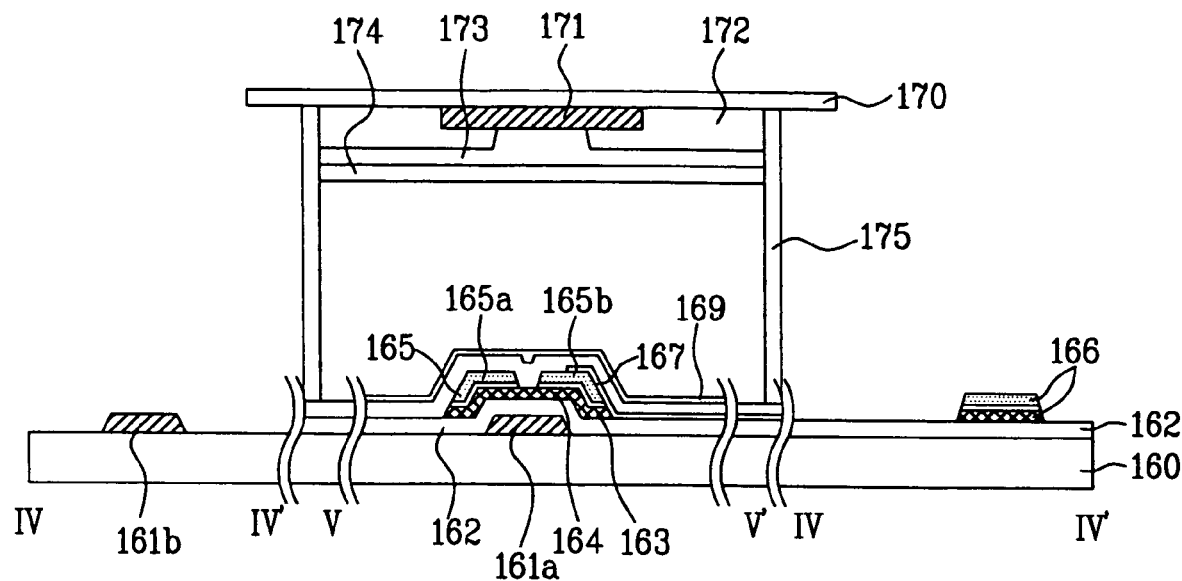
FIG. 17B illustrates a section showing the step of exposing a pad portion in an LCD panel in accordance with the third exemplary embodiment of the present invention.

FIG. 17A illustrates a section showing the step of bonding a TFT array substrate and a color filter array substrate of an LCD panel in accordance with a third preferred embodiment of the present invention, and FIG. 17B illustrates a section showing the step of exposing a pad portion in an LCD panel in accordance with a third exemplary embodiment of the present invention. In the third exemplary embodiment of the present invention, three masks are used in fabrication of the thin film transistor array substrate.

Referring to FIG. 16A, a gate metal layer is formed on the lower substrate 160 by deposition, such as sputtering, and patterned with a first mask by photolithography and etching, to form a gate line 161 (see FIG. 15) in one direction. A gate electrode 161a is formed projected from one side of the gate line 161, and a gate pad 161b is formed at one end of the gate line 161. The gate metal layer is one or two layers of Cr, Mo, or Al.

Referring to FIG. 16B, a gate insulating film 162, an active layer 163, an ohmic contact layer 164, and data patterns are formed on the lower substrate 160 including the gate patterns (the gate line 161, the gate electrode 161a, and the gate pad 161b) in succession. A data pad 166 is also formed in the data pad portion. In more detail, the gate insulating film 162, the first and second semiconductor layers (an amorphous silicon layer, and an n+ amorphous silicon layer), and a data metal layer are formed on the lower substrate 162 having the gate patterns formed thereon in succession by deposition, such as PECVD, or sputtering. A photoresist pattern is formed on the data metal layer with a second mask by photolithography. In this instance, using a refractive exposure mask having a refractive exposure portion at a channel portion of the thin film transistor as the second mask, the photoresist pattern at the channel portion has a height lower than other data pattern parts. Then, wet etching is carried out using the photoresist pattern to pattern the data metal layer, thereby forming data patterns including a data line 165, a source electrode 165a, and a drain electrode 165b integrated with the source electrode 165a. Next, dry etching is carried out using the same photoresist pattern to simultaneously pattern the n+ amorphous silicon layer and the amorphous silicon layer, thereby forming the ohmic contact layer 164 and the active layer 163. After the photoresist pattern having a height relatively lower in the channel portion is removed by ashing, and the data pattern and the ohmic contact layer 164 in the channel portion are etched by dry etching. Accordingly, the active layer 163 in the channel portion is exposed to separate the source electrode 165a and the drain electrode 165b. The photoresist pattern remaining on the data pattern portion is stripped off. In the foregoing process, the photoresist pattern is also formed in the data pad portion. The data pad 166 having the amorphous silicon layer, the n+ amorphous silicon layer, and the data metal layer stacked thereon are formed as the wet and dry etching are carried out. The gate insulating film 162 is formed of an inorganic insulating material, such as silicon oxide SiOx, or silicon nitride SiNx. The data metal layer is formed of Mo, Ti, Ta, or an Mo alloy.

Referring to FIG. 16C, a transparent pattern is formed with a third mask. In more detail, a transparent electrode material is formed on an entire surface of the gate insulating film 162 having the data patterns formed thereon by deposition, such as sputtering or the like. Then, the transparent electrode material is patterned with a third mask by photolithography and etching to form a pixel electrode 167 in the pixel region. The pixel electrode 167 is overlapped and electrically connected with one side of the drain electrode 165b. The transparent electrode may be formed of Indium Tin Oxide (ITO), Tin Oxide (TO), or Indium Zinc Oxide (IZO). Next, a protection film 168 is formed on the TFT array substrate. The protection film 47 is formed of an inorganic insulating material, such as SiNx and SiOx, an acryl group organic compound of a low dielectric constant, or an organic insulating material, such as BCB or PFCB, or the like.

Thereafter, referring to FIG. 17A, the TFT array substrate and the color filter array substrate are bonded. Before the bonding, a lower alignment film 169 is coated on the protection film 168 of the TFT array substrate except the pad region, the gate pad portion, and the data pad portion positioned therein. The lower substrate 160 and the upper substrate 170 are bonded with sealant 175 to expose the pad region of the lower substrate 160. The color filter array substrate includes a black matrix 171 on the upper substrate 170, a color filter 172 formed in each cell region separated by the black matrix 171, and a common electrode 173 and an upper alignment film 174 stacked in succession on the black matrix 171 and the color filter 172.

Next, referring to FIG. 17B, the protection film 168 and the gate insulating film 162 in the pad region of the TFT array substrate are etched using the color array substrate as a mask. Accordingly, the gate pad 161b and the data pad 166 are exposed. In the etching, dry etching using a laser beam, atmospheric plasma, or wet etching using dipping or spray may be used. The gate pad 161b and the data pad 166 may be exposed using a similar process as that of the first embodiment.

Figure 18:
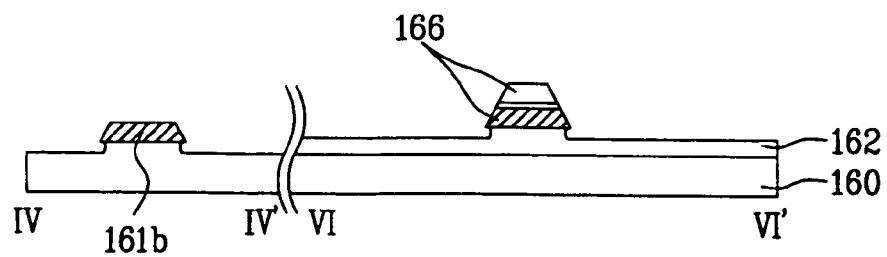
FIG. 18 illustrates a section showing an overetch in opening a gate pad and a data pad in accordance with the third exemplary embodiment of the present invention.

Thus, the method for fabricating a TFT array substrate of the present invention can further simplify the fabrication process by employing a three mask fabrication process. However, in the etching of the gate insulating film 162 and the protection film 168 to expose the gate pad 161b and the data pad 166, the lower substrate 160 or the gate insulating film 162 is overetched, as shown in FIG. 18, thereby causing undercut of the gate pad 161b and the data pad 166.

For preventing the undercut, a method for fabricating an LCD panel in accordance with a fourth exemplary embodiment of the present invention will be described. In the fourth exemplary embodiment of the present invention, the TFT array substrate is fabricated using three masks. The TFT array substrate before bonding of the upper and lower substrates will be described.

Figure 19:
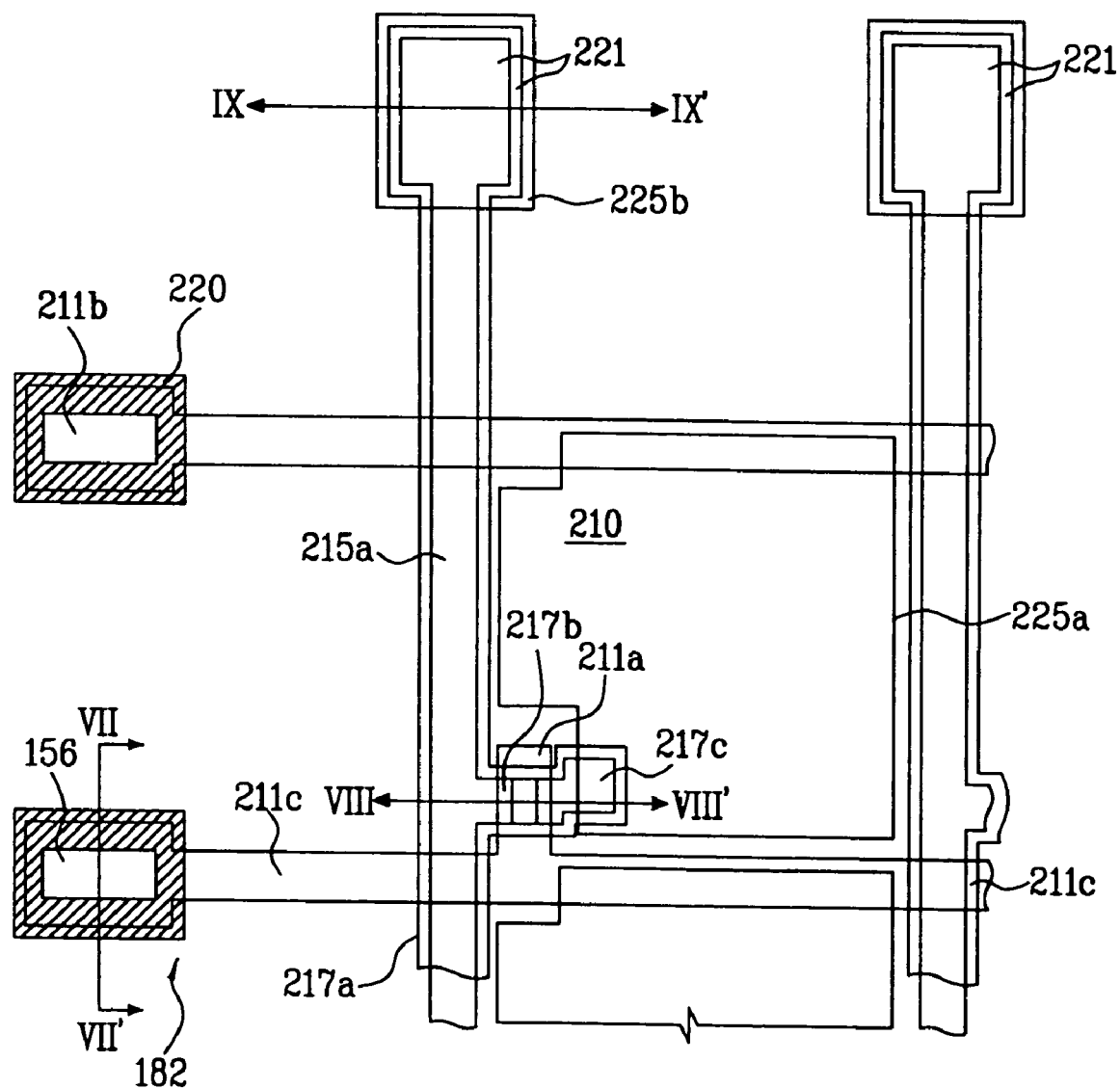
FIG. 19 illustrates a plan view of a TFT array substrate in an LCD panel in accordance with a fourth exemplary embodiment of the present invention.
Figure 20:
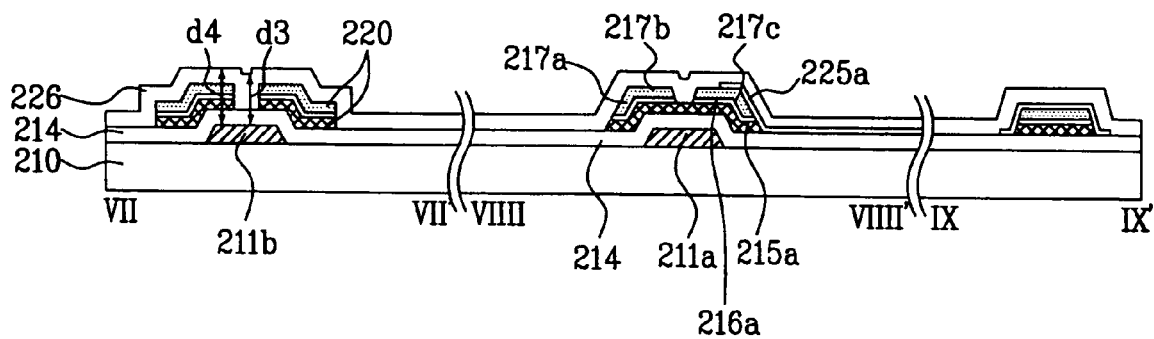
FIG. 20 illustrates sections across lines VII-VII', VIII-VIII', and IX-IX' in FIG. 19.

Referring to FIGS. 19 and 20, the TFT array substrate includes gate lines 211c and data lines 217a arranged to cross each other with a gate insulating film 214 in between, a thin film transistor T at every cross of the gate lines 211c and data lines 217a, a pixel electrode 225a formed in each cell region formed by the cross, a gate pad 211b formed at an end of the gate line 211, and a data pad 221 formed at an end of the data line 217a. The thin film transistor T includes a gate electrode 211a projected from one side of the gate line 211c, a source electrode 217b projected from one side of the data line 217a, a drain electrode 217c connected to the pixel electrode 255a, and an active layer 215a overlapped with the gate electrode 211a as a channel between the source electrode 217b and the drain electrode 217c. The active layer 215a is overlapped with the data pad 221, the data line 217a, the source electrode 217b and the drain electrode 217c, and further includes a channel region between the source electrode 217b and the drain electrode 217c. An ohmic contact layer 216a is formed on the active layer 215a for ohmic contact with the data pad 221, the data line 217a, the source electrode 217b and the drain electrode 217c. The thin film transistor T supplies a pixel voltage signal to the data line 217a in response to a gate signal supplied to the gate line 211c to be charged to and stored in the pixel electrode 225a. The pixel electrode 225a is connected to the drain electrode 217c of the thin film transistor T. The pixel voltage of the pixel electrode 255a causes a potential difference with the common electrode formed on the upper substrate (not shown). The potential difference rotates the liquid crystal between the TFT substrate and the upper substrate by dielectric anisotropy to transmit the light incident thereto from a light source (not shown) through the pixel electrode 255a toward the upper substrate.

The gate line 211c is connected to a gate driver (not shown) through the gate pad part. The gate pad portion has a gate pad 211b extended from the gate line 211c. On the gate pad 211b, there are the gate insulating film 214, an overetch protection pattern 220 partly overlapped with the gate pad 211b, and a protection film 226 are stacked in succession. The data line 217a is connected to a data driver (not shown) through the data pad portion. The data pad portion includes the data pad 221 extended from the data line 217a, and a data pad protection electrode 225b for protection of the data pad 221. Between the data pad 221 and the gate insulating film 214, there are semiconductor patterns, i.e., the active layer 215a, and the ohmic contact layer 216a.

A method for fabricating the foregoing TFT array substrate in an LCD panel, and a method for fabricating an LCD panel having the TFT array substrate will be described.

FIG. 19 illustrates a plan view of a TFT array substrate in an LCD panel in accordance with the fourth exemplary embodiment of the present invention, and FIG. 20 illustrates sections across lines VII-VII', VIII-VIII', and IX-IX' in FIG. 19. FIGS. 21A-21G illustrate sections across lines VII-VII', VIII-VIII', and IX-IX' in FIG. 19 showing the steps of a fabrication method. FIG. 22A illustrates a section showing the step of bonding a TFT array substrate and a color filter array substrate of an LCD panel in accordance with the fourth exemplary embodiment of the present invention, and FIG. 22B illustrates a section showing the step of exposing a pad portion in an LCD panel in accordance with the fourth exemplary embodiment of the present invention.

Figure 21A:
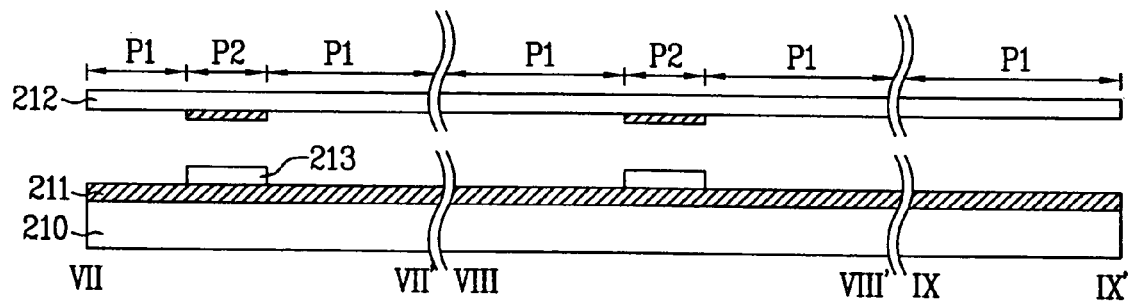
FIGS. 21A-21G illustrate sections across lines VII-VII', VIII-VIII', and IX-IX' in FIG. 19 showing the steps of a fabrication method.
Figure 21B:
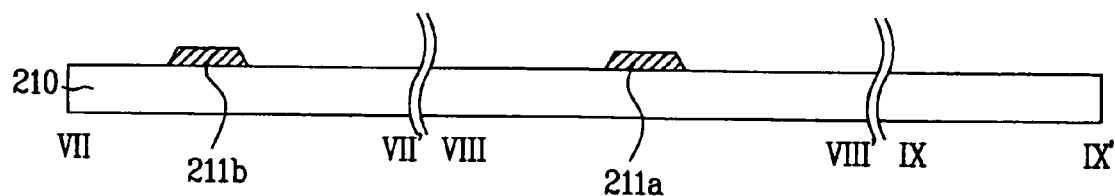
Figure 22A:
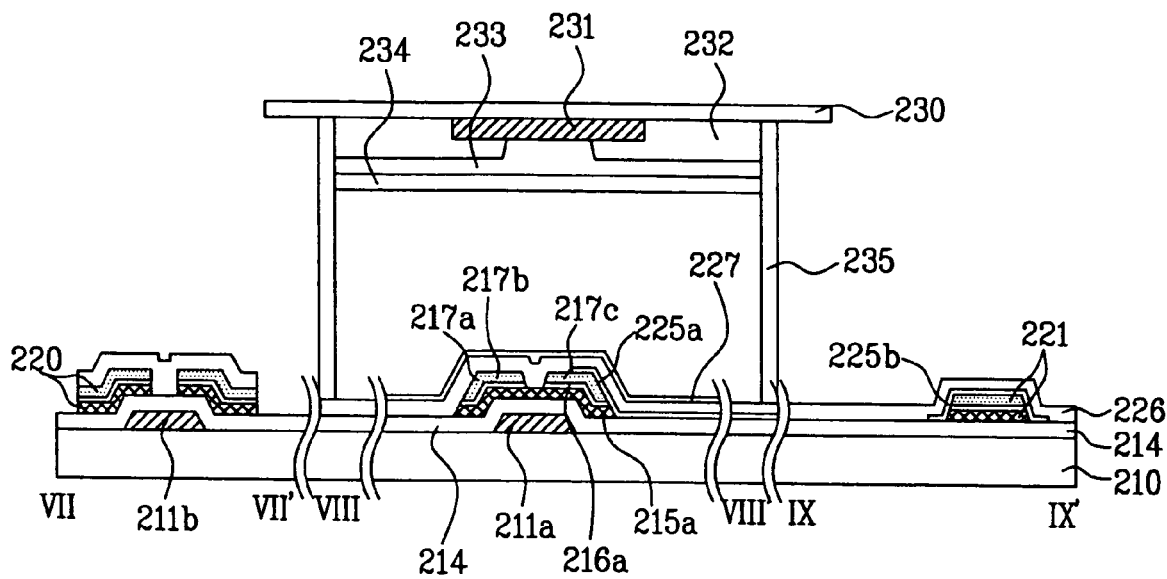
FIG. 22A illustrates a section showing the step of bonding a TFT array substrate and a color filter array substrate of an LCD panel in accordance with the fourth exemplary embodiment of the present invention.
Figure 22B:
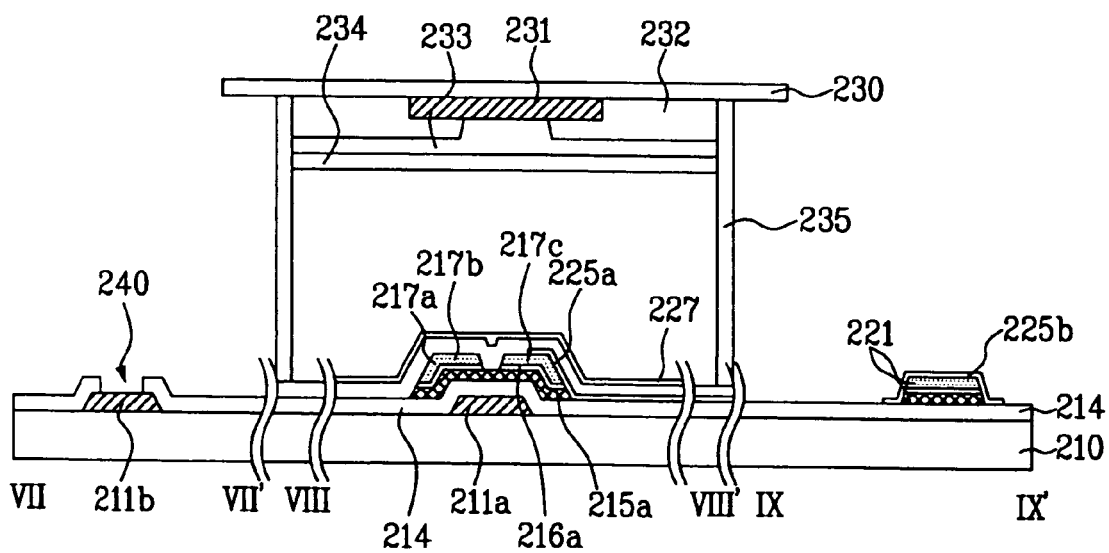
FIG. 22B illustrates a section showing the step of exposing a pad portion in an LCD panel in accordance with the fourth exemplary embodiment of the present invention.

Referring to FIGS. 21A and 21B, a gate pattern is formed on a lower substrate 210 by a first mask process. In detail, referring to FIG. 21A, a gate metal layer 211 is formed on the lower substrate 210 by deposition, such as sputtering, and a photoresist is coated on the gate metal layer 211, and patterned with a first mask 212 having a transmitting portion P1 and a shielding portion P2 by photolithography to form a photoresist pattern 213. Referring to FIG. 21B, the gate metal layer 211 is etched using the photoresist pattern 213 to pattern the gate metal layer 211, thereby forming a gate line 211a arranged in one direction (see FIG. 19). A gate electrode 211b is formed projected from one side of the gate line 211a, and gate patterns are formed including a gate pad 211b at an end of the gate line 211a. The gate metal layer is one or two layers of Cr, Mo, or Al.

Figure 21C:
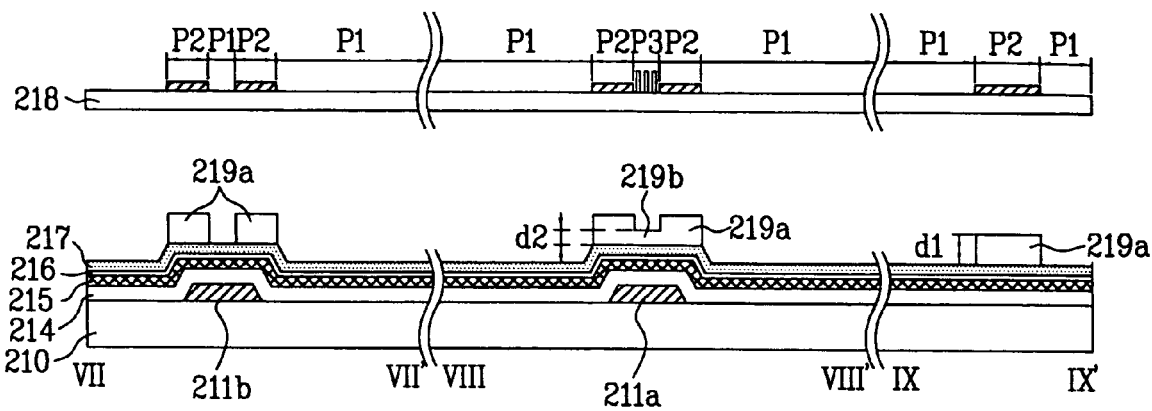
Figure 21D:
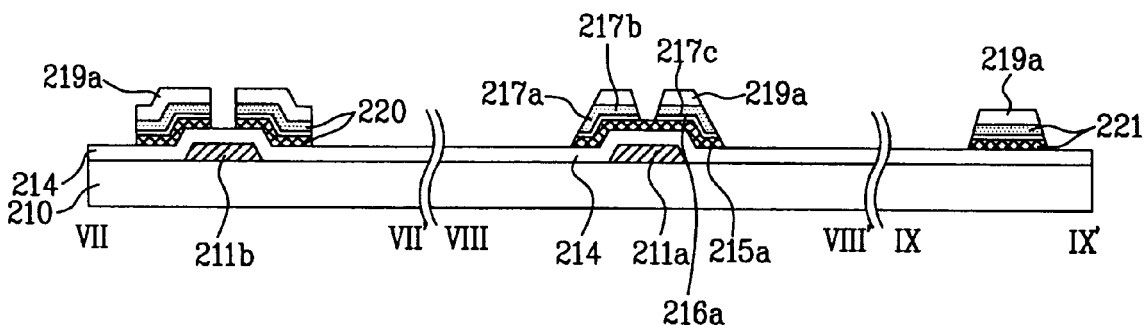
Figure 21E:
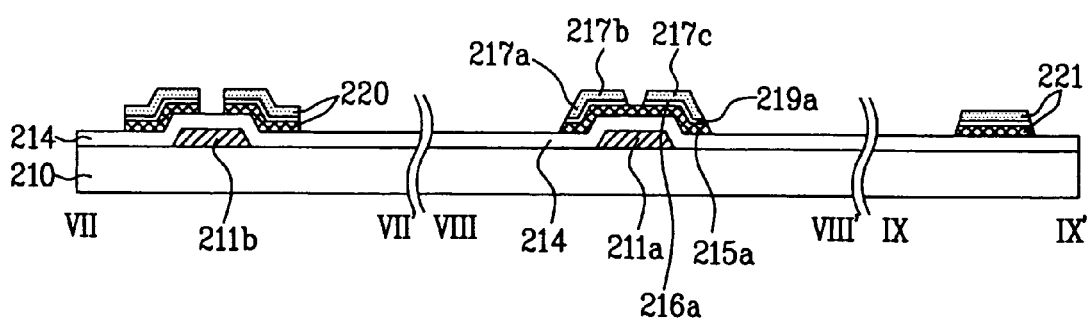

Referring to FIGS. 21C and 21E, a gate insulating film 214 is coated on an entire surface, and a semiconductor pattern and a gate pattern are formed thereon by a second mask process. In detail, referring to FIG. 21C, a gate insulating film 214, a first semiconductor layer 215 of an amorphous silicon, a second semiconductor layer 216 of an n$^+$ amorphous silicon layer, and a data metal layer 217 are formed on the lower substrate 210 having the gate patterns successively formed thereon by deposition, such as PECVD, and sputtering. The gate insulating film 214 is formed of an inorganic insulating material, such as silicon oxide SiOx, or silicon nitride SiNx. The data metal layer is formed of Mo, Ti, Ta, or an Mo alloy. Then, photoresist is coated on an entire surface of the data metal layer 217 and subjected to photolithography using a second mask 218 (i.e., a partial exposure mask) to form photoresist patterns 219a and 219b. The second mask 218 has a transmitting portion P1, a shielding portion P2, and a partial transmitting portion P3 with a refractive exposure slit. The photolithography with the second mask 218 removes the photoresist opposite to the transmitting portion P1 of the second mask 218 forms a first height d1 as the photoresist pattern 219a opposite to the shielding portion P2 is not exposed, and forms a second height d2 at the photoresist pattern 219b opposite to the partial transmitting portion P3. Here, the photoresist pattern 219 opposite to the channel portion of the thin film transistor is made to have a height d2 lower than other data pattern part.

Referring to FIG. 21D, the data metal layer 217 is wet etched with the photoresist pattern to pattern the data metal layer 217, thereby forming data patterns including a data pad, an overetch prevention pattern, a data line 217a, a source electrode 217b, and a drain electrode 217c integrated with the source electrode 217b. At the same time, an overetch prevention pattern 220 is further formed to partly overlap with an outer portion of the gate pad 211b but not overlaping with a central portion of the gate pad 211b so that the gate insulating film 214 is disposed inbetween. Then, the photoresist pattern having a height d2 relatively lower height in the channel portion is removed by ashing. The data pattern and the ohmic contact layer 216a in the channel region are etched by dry etching to expose the active layer 215a in the channel portion and to separate the source electrode 217b and the drain electrode 217c. By the foregoing process, a data pad 221 having a stack of the first and second semiconductor layers and the data metal layer is formed at the end of the data line 217a.

Figure 21F:
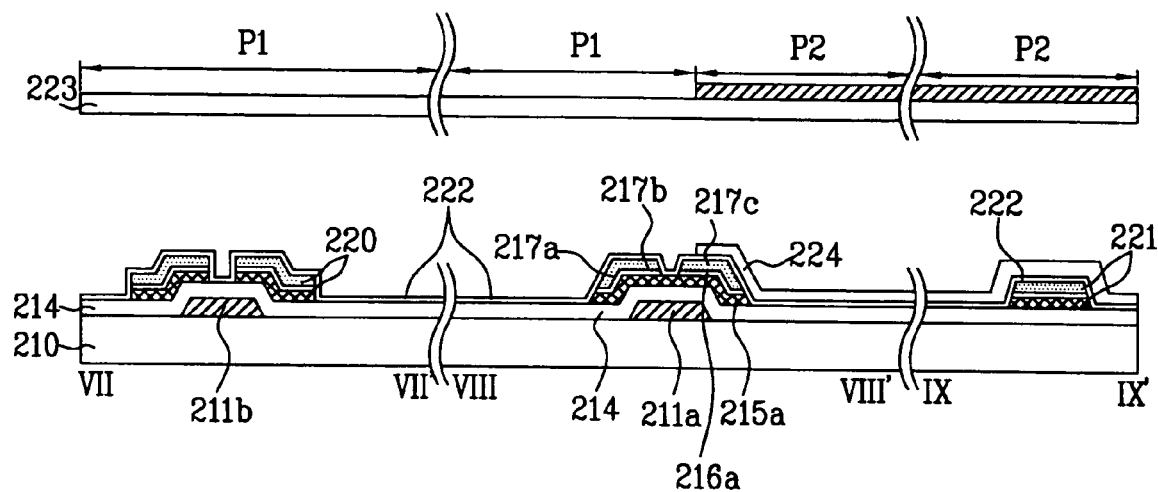

Referring to FIG. 21E, the photoresist pattern 219a is removed by stripping. Referring to FIG. 21F, a transparent electrode material 222 is deposited on an entire surface of the gate insulating film 214 having the data patterns formed thereon by deposition, such as sputtering, and photoresist is coated on an entire surface of the transparent electrode material 222. Then, a photoresist pattern 224 is formed using a third mask 223 with a transmitting portion P1 and a shielding portion P2. Here, the photoresist exposed to a UV beam through the transmitting portion P1 is removed, and the photoresist not exposed due to the shielding portion P2 remains.

Figure 21G:
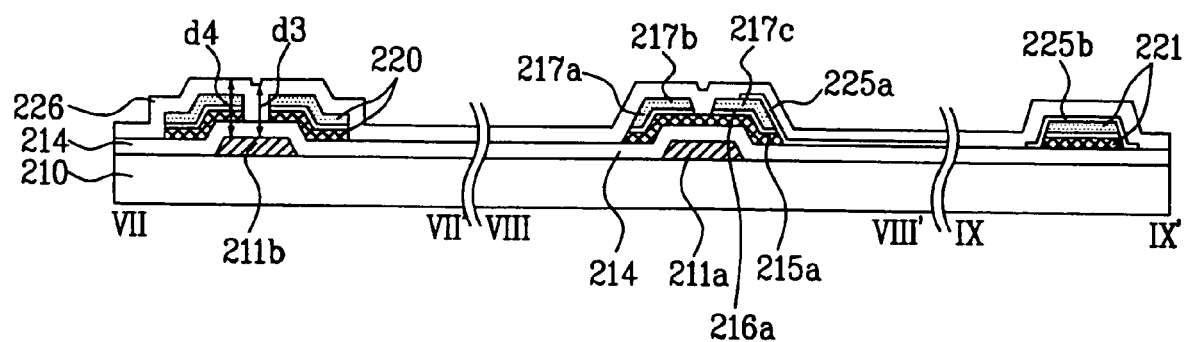

Referring to FIG. 21G, the transparent electrode material 222 is patterned by etching using the photoresist pattern 223 as a mask, thereby forming a pixel electrode 225a and a data pad protection electrode 225b such that the pixel electrode 225a is electrically connected to the drain electrode 217c, and the data pad protection electrode 225b has a width larger than the data pad 221. The transparent electrode may be formed of Indium Tin Oxide (ITO), Tin Oxide (TO), or Indium Zinc Oxide (IZO). Then, a protection film 226 is coated on the lower substrate 210 having the pixel electrode 225a formed thereon. The protection film 226 is formed of an inorganic insulating material, such as SiNx or SiOx, an acryl group organic compound of a low dielectric constant, or an organic insulating material, such as BCB or PFCB, or the like.

Referring to FIG. 22A, the TFT array substrate and the color filter array substrate are bonded with a sealant 235. Before the bonding, a lower alignment film 227 is coated on the protection film 226 of the TFT array substrate excluding a pad region having the gate pad portion and the data pad portion positioned therein. The color filter array substrate includes a black matrix 231, a color filter 232 in each cell region separated by the black matrix 231, a common electrode 233, and an upper alignment film 234 stacked in succession on the black matrix 231 and the color filter 232. Accordingly, the pad region including the gate portion and the data pad portion is exposed.

Then, referring to FIG. 22B, the protection film 226 and the overetch prevention pattern 220 in the pad region are entirely removed by a pad opening using the color filter substrate as a mask, and a gate hole 240 is formed in a gate insulating film 214 to overlap with the gate pad 211b. Alternatively, it should be recognized that the overetch prevention pattern 220 need not be removed and can remain. The pad opening exposes the gate pad 211b and the data pad protection electrode 225b. As the protection film 226 is removed at the pad opening, the data pad terminal 225b and the gate insulating film 214 in the vicinity of the data pad terminal 225b are exposed. Similarly, the gate pad 221b, as the protection film 226 and the overetch prevention pattern 220 are removed, and the gate hole 240 is formed in the gate insulating film 214, the gate pad 211b is exposed.

Since the overetch prevention pattern 220 is formed overlapped with an outer portion of the gate so that the gate insulating film 214 is disposed inbetween, a thickness 'd' of the overetch prevention pattern 220 and the protection film 226 stacked on the outer portion of the gate pad 211b is thicker than a height of the gate insulating film 214 and the protection film 214 stacked on a central portion of the gate pad 211b. For an example, if a height of the gate insulating film 214 and the protection film 226 is 4000-6000 Å (Angstroms), a height of the overetch prevention pattern 220 and the protection film 226 is 7000-9000 Å (Angstroms). Accordingly, in the pad opening, only the protection film 226 and the overetch prevention pattern 220 are removed from the outer portion of the gate pad 211b, thereby leaving the gate insulating film 214. Thus, since the gate pad portion has the gate insulating film 214 left at the outer portion thereof, and the data pad portion has the data pad protection electrode 225b protecting the data pad, the undercut in the pad opening can be prevented.

As has been described, the method for fabricating an LCD panel of the present invention has the following advantage. First, the carrying out of the gate pad and data pad opening, not during fabrication of the lower substrate, but after bonding of the upper and lower substrates permits simplification of a lower substrate fabrication process. Second, the opening of the gate pad and the data pad by dipping in an etchant after bonding the upper and lower substrates permits to prevent defective opening of the gate pad or the data pad. Third, the formation of the overetch prevention pattern overlapped with the gate insulating film at an outer portion of the gate pad and the formation of the data pad protection electrode on the data pad prevents undercut in the pad opening.

It will be apparent to those skilled in the art that various modifications and variations can be made in the method for fabricating a liquid crystal display panel of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display panel, comprising the steps of:
   forming a thin film transistor array substrate including:
      a screen region having gate lines, data lines, thin film transistors, and pixel electrodes,
      a pad region having gate pads, an overetch prevention pattern formed overlapped with a gate insulating film in an outer portion of each gate pad, and data pads,
      data pad protection electrodes each on a respective data pad, and
      a protection film on an entire surface of the screen region and the pad region;
   forming a color filter array substrate;

making a cell by bonding the thin film transistor array substrate and the color filter array substrate so that the pad region remains uncovered;

etching the protection film of the cell and the overetch prevention pattern of the uncovered pad region of the cell to expose the gate pads and the data pad protection electrodes, and to form gate holes in the gate insulating film over corresponding gate pads; and wherein the data pad protection electrodes are each formed having a width greater than a width of each of the data pads.

2. The method according to claim 1, wherein the step of forming a thin film transistor array substrate includes the steps of:

forming the gate lines, gate electrodes each projected from a side of a respective gate line, and the gate pads each at an end of a respective gate line on a substrate using a first mask process;

forming a gate insulating film on the substrate having the gate lines, the gate electrodes, and the gate pads;

forming the data lines crossing the gate lines, source electrodes of the thin film transistors each projected from a side of a respective data line, drain electrodes each spaced from a respective source electrode, a data pattern having the data pads each at an end of a respective data line, a semiconductor pattern formed under the data pattern to form respective channel portions between the source electrodes and the drain electrodes, and an overetch protection pattern at an outer portion of the gate pads to overlap with the gate insulating film, using a second mask process;

forming a transparent electrode pattern having the pixel electrodes and the data pads using a third mask; and forming a protection film on the substrate including the transparent electrode pattern.

3. The method according to in claim 2, wherein the overetch prevention pattern includes a semiconductor pattern and the data pattern overlapped thereon.

4. The method according to claim 1, wherein the step of forming the color filter array substrate includes the steps of:
forming a black matrix layer;
forming a color filter in each cell region separated by the black matrix layer;
forming a common electrode on the black matrix layer and the color filter; and
forming an upper alignment film on the common electrode.

5. The method according to claim 1, wherein the step of forming a thin film transistor array substrate further includes the step of coating a lower alignment film on the substrate excluding the pad region.

6. The method according to claim 1, wherein the step of forming a thin film transistor array includes the steps of:
forming the gate line, the gate pad at one end of the gate line, and a gate electrode projected from a side of the gate line on the lower substrate using a first mask;
forming an insulating film on a surface of the lower substrate having the gate line, the gate pad, and the gate electrode;
forming an active layer having an island shape on the insulating film over the gate electrode using a second mask;
forming the data line to cross the gate line, the data pad at an end of the data line, a source electrode projected from the data line in a direction toward the gate electrode, and a drain electrode spaced a distance from the source electrode using a third mask, a pixel region being defined by the crossed data line and gate line;
forming the pixel electrode in the pixel region to contact the drain electrode using a fourth mask; and
forming a protection film on a surface of the lower substrate having the insulating film, the active layer, the data line, the data pad, the source electrode, and the drain electrode.

7. The method according to in claim 6, wherein the overetch prevention pattern includes a semiconductor pattern and the data pattern overlapped thereon.

* * * * *